(12) United States Patent
Okada et al.

(10) Patent No.: US 11,897,387 B2
(45) Date of Patent: Feb. 13, 2024

(54) VEHICLE MONITORING DEVICE, VEHICLE, AND VEHICLE MONITORING SYSTEM

(71) Applicant: Panasonic Intellectual Property Management Co., Ltd., Osaka (JP)

(72) Inventors: Tsukasa Okada, Osaka (JP); Kensho Teranishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 84 days.

(21) Appl. No.: 16/904,674

(22) Filed: Jun. 18, 2020

(65) Prior Publication Data

US 2020/0317117 A1    Oct. 8, 2020

Related U.S. Application Data

(63) Continuation of application No. PCT/JP2018/043361, filed on Nov. 26, 2018.

(30) Foreign Application Priority Data

Dec. 26, 2017    (JP) .................... 2017-249998

(51) Int. Cl.
*B60Q 1/30* (2006.01)
*B60W 40/10* (2012.01)
*B60W 40/107* (2012.01)

(52) U.S. Cl.
CPC ......... *B60Q 1/307* (2013.01); *B60W 40/1005* (2013.01); *B60W 40/107* (2013.01); *B60W 2420/42* (2013.01)

(58) Field of Classification Search
CPC ............. B60Q 1/307; B60W 2420/42; B60W 40/1005; B60W 40/107; B60W 40/13;
(Continued)

(56) References Cited

U.S. PATENT DOCUMENTS 9,870,649 B1 *   1/2018   Fields .................. G06K 9/6256
2012/0200697 A1  8/2012   Wuestefeld et al.
2017/0351268 A1* 12/2017  Anderson ............... H04W 4/44

FOREIGN PATENT DOCUMENTS

CN   105928598 A  *  9/2016
JP   64-013407 A     1/1989
(Continued)

OTHER PUBLICATIONS

International Search Report of PCT application No. PCT/JP2018/043361 dated Dec. 25, 2018.
(Continued)

*Primary Examiner* — Quan Zhen Wang
*Assistant Examiner* — Rajsheed O Black-Childress
(74) *Attorney, Agent, or Firm* — Rimon, P.C.

(57) ABSTRACT

A vehicle monitoring device includes a positioning device, a distance calculator, a first imaging device, a volume calculator, and a work calculator. The positioning device measures a position of a vehicle including a loading platform. The distance calculator calculates a movement distance of the vehicle based on the position of the vehicle measured by the positioning device. The first imaging device captures an image of a load mounted on the loading platform. The volume calculator calculates a volume of the load based on the image captured by the first imaging device. The work calculator calculates a work of the vehicle based on the movement distance and the volume of the load.

18 Claims, 24 Drawing Sheets

(58) Field of Classification Search
CPC .. G01C 21/28; G01L 5/00; G06T 7/62; G07C 5/008; G07C 5/0841; G08G 1/00
See application file for complete search history.

(56) References Cited

FOREIGN PATENT DOCUMENTS

| | | |
|---|---|---|
| JP | 2000-283734 A | 10/2000 |
| JP | 2007-197129 | 8/2007 |
| JP | 2008-056436 | 3/2008 |
| JP | 2008-107916 | 5/2008 |
| JP | 2008-175717 | 7/2008 |
| JP | 2009-256081 | 11/2009 |
| JP | 2011-219229 | 11/2011 |
| JP | 2012-103919 A | 2/2012 |
| JP | 2013-035399 | 2/2013 |

OTHER PUBLICATIONS

Rosten et al., "Machine learning for high-speed corner detection", Proceedings of the 9th European conference on Computer Vision, vol. Part I, pp. 430-443, Springer-Verlag, 2006.
C. Tomasi et al., "Detection and Tracking of Point Features, Shape and Motion from Image Streams: a Factorization Method—Part 3", Technical Report CMU-CS-91-132, School of Computer Science, Carnegie Mellon University, 1991.
D. Nister, "An efficient solution to the five-point relative pose problem", Proceedings in 2003 IEEE Computer Society Conference on Computer Vision and Pattern Recognition, 2003.
A. Singh, "Monocular Visual Odometry", [online], Apr. 24, 2015, [Searched on Dec. 25, 2017] (URL:http://avisingh599.github.io/assets/ugp2-report.pdf).
H. Uchiyama et al., "Random dot markers", IEEE Virtual Reality (VR), pp. 35-38, Mar. 2011.

* cited by examiner

VEHICLE MONITORING DEVICE, VEHICLE, AND VEHICLE MONITORING SYSTEM

TECHNICAL FIELD

The present disclosure relates to a vehicle monitoring device that monitors an operation of a vehicle, and a vehicle that includes such a vehicle monitoring device. The present disclosure also relates to a vehicle monitoring system that includes such a vehicle and a server.

BACKGROUND ART

When a load is moved in a predetermined area or between predetermined points by using a vehicle for load carriage, in some cases, it is requested that a position of the vehicle be measured and tracked. For example, PTL 1 discloses a load location management device that measures a position of a vehicle by using a positioning technique such as the global positioning system (GPS), wireless local area network (LAN) positioning, or infrared positioning.

CITATION LIST

Patent Literature

PTL 1: Unexamined Japanese Patent Publication No. 2011-219229

Non-Patent Literature

NPL 1: E. Rosten et al., "Machine learning for high-speed corner detection", Proceedings of the 9th European conference on Computer Vision, Volume Part I, Pages 430-443, Springer-Verlag, 2006

NPL 2: C. Tomasi et al., "Detection and Tracking of Point Features, Shape and Motion from Image Streams: a Factorization Method Part 3", Technical Report CMU-CS-91-132, School of Computer Science, Carnegie Mellon University, 1991

NPL 3: D. Nister, "An efficient solution to the five-point relative pose problem", Proceedings in 2003 IEEE Computer Society Conference on Computer Vision and Pattern Recognition, 2003

NPL 4: A. Singh, "Monocular Visual Odometry", [online], Apr. 24, 2015 [searched on Dec. 25, 2017] (URL: http://avisingh599.github.io/assets/ugp2-report.pdf)

NPL 5: H. Uchiyama et al., "Random dot markers", IEEE Virtual Reality (VR), pp. 35-38, March 2011

SUMMARY

A movement route, a movement distance, and the like of a vehicle can be obtained by tracking a position of the vehicle. Conventionally, a method has been proposed for regarding a movement distance of a vehicle as a work of the vehicle and determining whether maintenance needs to be performed on the vehicle based on the movement distance. However, a magnitude of a load imposed on a vehicle changes according to whether the vehicle is carrying loads. Therefore, it is impossible to accurately determine whether maintenance needs to be performed on the vehicle based on only a movement route and a movement distance of the vehicle (stated another way, a position of the vehicle).

Accordingly, there is a request for a new index that more accurately indicates a work of a vehicle than a conventional index.

It is an object of the present disclosure to solve the above problem and provide a vehicle monitoring device that monitors an operation of a vehicle and more accurately measures a work of the vehicle than a conventional device.

A vehicle monitoring device according to one aspect of the present disclosure includes:
- a positioning device that measures a position of a vehicle including a loading platform;
- a distance calculator that calculates a movement distance of the vehicle based on the position of the vehicle measured by the positioning device;
- a first imaging device that captures an image of a load mounted on the loading platform;
- a volume calculator that calculates a volume of the load based on the image captured by the first imaging device; and
- a work calculator that calculates a work of the vehicle based on the movement distance and the volume of the load.

These general and specified aspects may be achieved by a system, a method, a computer program, and any combination of the system, the method, and the computer program.

According to the present disclosure, a vehicle monitoring device that monitors an operation of a vehicle and more accurately measures a work of the vehicle than a conventional device can be provided.

DESCRIPTION OF EMBODIMENTS

Exemplary embodiments of the present disclosure are described below with reference to the drawings. In respective exemplary embodiments described below, similar components are denoted by the same reference mark.

First Exemplary Embodiment

In a case where positioning is performed on a vehicle that is moving outdoors, a positioning method using the GPS is generally used. In contrast, radio waves from a GPS satellite fail to be received indoors, e.g., in factories or warehouses, and therefore it is impossible to use the positioning method using the GPS.

An example of an indoor positioning method is a positioning method using a wireless signal, such as ultra wide band (UWB), Wi-Fi, or Bluetooth (registered trademark) low energy (BLE). However, in the positioning method using the wireless signal, it is requested that a large number of wireless transmitters that transmit wireless signals be provided within a movement range of a vehicle, and this results in a high cost for initial introduction.

Another example of the indoor positioning method is what is called pedestrian dead reckoning (PDR). However, it is difficult to measure a position with high precision by using PDR.

Accordingly, there is a request for a positioning device that is capable of measuring a position of a vehicle with sufficiently high precision without requiring a high cost.

In a first exemplary embodiment, a novel positioning device is provided that measures a position of a vehicle by using an imaging device.

Figure 1:
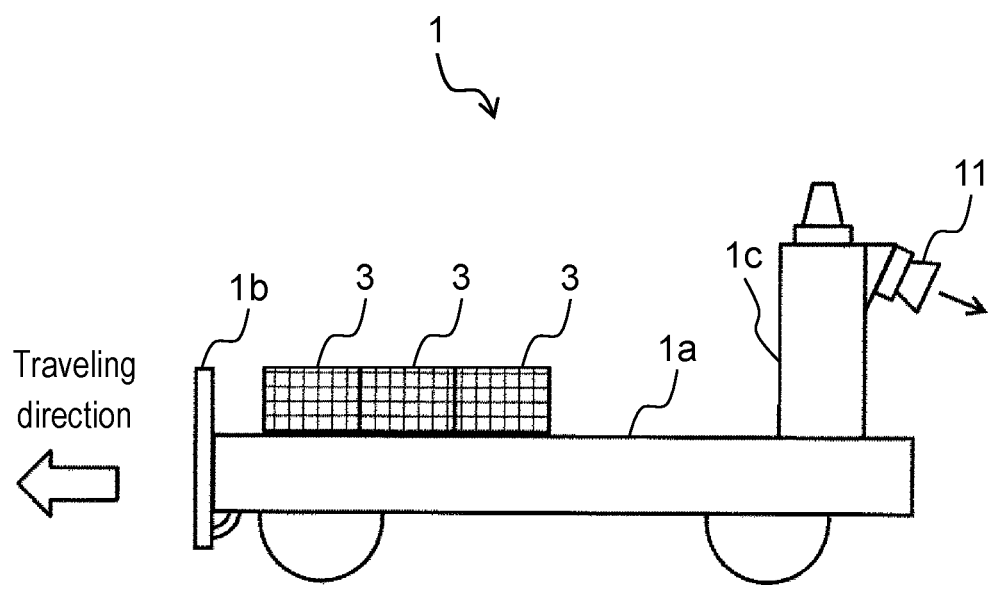
FIG. 1 is a schematic diagram illustrating a configuration of vehicle 1 according to a first exemplary embodiment.

FIG. 1 is a schematic diagram illustrating a configuration of vehicle 1 according to the first exemplary embodiment. Vehicle 1 is, for example, a load carrying robot such as an automatic guided vehicle (AGV) of a pallet conveying robot. Vehicle 1 includes loading platform 1a that is mounted with load 3, on a front side facing a traveling direction of vehicle 1 of a vehicle body. Vehicle 1 may further include elevating mechanism 1b that is used to load or unload load 3 onto or from loading platform 1a. Elevating mechanism 1b moves load 3 between the ground, a shelf, or the like and loading platform 1a in a vertical direction with respect to the ground. The vehicle body of vehicle 1 is provided with imaging device 11 in order to image a rear side of vehicle 1 that is reverse to the traveling direction of vehicle 1. In addition, vehicle 1 may include mast 1c that supports imaging device 11 at a predetermined height from the ground. Herein, a normal traveling direction of vehicle 1 (stated another way, a front face of the load carrying robot) is referred to as "front", and a direction reverse to the normal traveling direction is referred to as "rear".

Figure 2:
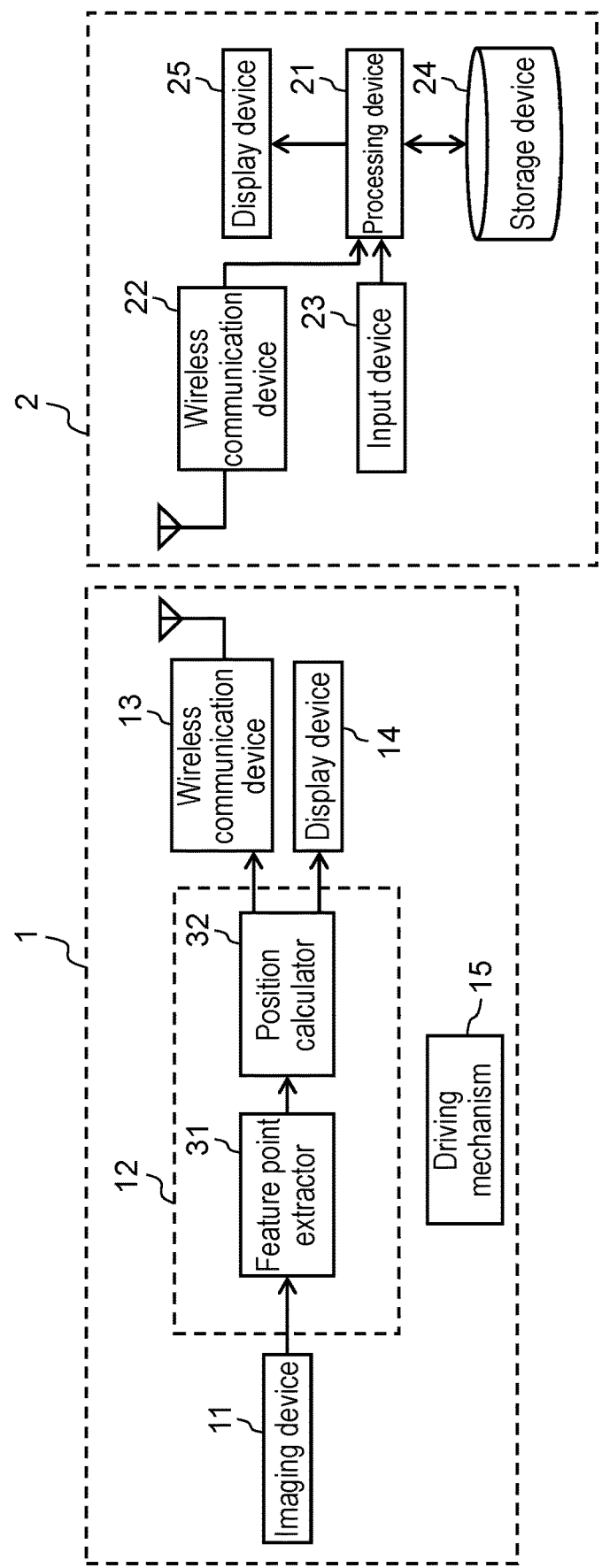
FIG. 2 is a block diagram illustrating a configuration of a positioning system including vehicle 1 of FIG. 1.

FIG. 2 is a block diagram illustrating a configuration of a positioning system including vehicle 1 of FIG. 1. The positioning system of FIG. 2 includes at least one vehicle 1 and server 2. Each of vehicles 1 includes a positioning device that measures a position of each of vehicles 1 based on an image captured by imaging device 11. Server 2 obtains, from each of vehicles 1, the position of each of vehicles 1, and records the position of each of vehicles 1.

Vehicle 1 includes imaging device 11, processing device 12, wireless communication device 13, display device 14, and driving mechanism 15.

Imaging device 11 is configured to generate an image of a subject and detect a distance from imaging device 11 to each point of the subject. Imaging device 11 may include, for example, a depth sensor such as an RGB-D camera or a time of flight (ToF) sensor in order to detect a distance from imaging device 11 to the subject. Alternatively, imaging device 11 may be a stereo camera including two cameras that are disposed to be spaced apart from each other by a predetermined distance, in order to detect a distance from imaging device 11 to the subject. Imaging device 11 transmits a captured image to processing device 12.

Imaging device 11 is fixed to the vehicle body of vehicle 1. By doing this, a change in a position and/or an orientation of vehicle 1 can be obtained by detecting a change in a position and/or an orientation of imaging device 11.

Imaging device 11 is provided in the vehicle body of vehicle 1 to image the rear side of vehicle 1, as described above. In a case where vehicle 1 includes loading platform 1a on the front side of the vehicle body, when an imaging device is provided in the vehicle body of vehicle 1 to image the front side of vehicle 1, a field of view of the imaging device is shielded by load 3 in some cases. Accordingly, imaging device 11 is provided in vehicle 1 to face the rear side of vehicle 1, as illustrated in FIG. 1, and this can avoid easily shielding the field of view of imaging device 11.

When vehicle 1 is moving forward, imaging device 11 images the rear side of vehicle 1 at predetermined time intervals. Imaging device 11 may capture a still image at predetermined time intervals, and may extract a frame from a series of frames of a moving image at predetermined time intervals.

Processing device 12 includes feature point extractor 31 and position calculator 32. Feature point extractor 31 extracts a feature point from an image captured by imaging device 11. The feature point is a point that has a luminance value or a color that can be distinguished from luminance values or colors of peripheral pixels so that a position of the point can be accurately determined. The feature point is detected, for example, from a corner or an edge of a construction or a pattern of a floor, a wall, or a ceiling in a building or a passage in which vehicle 1 moves. Position calculator 32 calculates a position of vehicle 1 based on the feature point of the image. Position calculator 32 may calculate the position and the orientation of vehicle 1 based on the feature point of the image, as described later.

Feature point extractor 31 and position calculator 32 may be implemented as dedicated circuits, or may be implemented as a program executed by a general-purpose processor.

Imaging device 11, feature point extractor 31, and position calculator 32 in FIG. 2 function as a positioning device that measures the position of vehicle 1.

Wireless communication device 13 includes a module such as Wi-Fi or Bluetooth and a control program of the module, and performs communication with server 2. Wireless communication device 13 transmits, to server 2, the position and the orientation of vehicle 1 that have been calculated by position calculator 32.

Display device 14 includes a lighting device or the like that displays an alarm or the like that relates to an operation of vehicle 1.

Driving device 15 includes an engine or a motor and a braking device of vehicle 1, a control device of the engine or the motor and the braking device, and the like.

Server 2 of FIG. 2 includes processing device 21, wireless communication device 22, input device 23, storage device 24, and display device 25. Processing device 21 is, for example, a general-purpose computer that includes a processor, a memory, and the like. Wireless communication device 22 is communicably connected to wireless communication device 13 of vehicle 1. Input device 23 includes a keyboard, a pointing device, and the like. Storage device 24 records the position and the orientation of vehicle 1 that have been received from vehicle 1. Display device 25 displays the position and the orientation of vehicle 1 that have been received from vehicle 1. Processing device 21 obtains a position of each of vehicles 1 from each of vehicles 1 via wireless communication device 22, records the position of each of vehicles 1 in storage device 24, and displays the position of each of vehicles 1 in display device 25.

Display device 25 displays the position and the orientation of vehicle 1 that have been calculated by position calculator 32 of vehicle 1. Processing device 21 may obtain, in advance, a map of a movement range (a factory, a warehouse, or the like) of vehicle 1, and may display, in display device 25, the position and the orientation of vehicle 1 that have been calculated by position calculator 32 in such a way that the position and the orientation of vehicle 1 are superimposed onto this map. Alternatively, processing device 21 may generate a map based on a movement route of vehicle 1 by using processing device 21 itself, and may display this map in display device 25.

Vehicle 1 controls driving mechanism 15 under the control of server 2 to move. Herein, a detailed description of this is omitted.

Next, an operation of imaging device 11 is described in detail.

In position and orientation calculation processing (described later) that is performed by position calculator 32, as a larger number of feature points of an object (a corner, an edge, a pattern, or the like) that is located near imaging device 11 are used, the position and the orientation of vehicle 1 can be calculated with higher precision. This is because, when a feature point of an object that is located far from imaging device 11 is used, deviation by one pixel causes a large difference in distance in a stereo camera. In addition, in general, even the RGB-D camera is likely to have a large error at a distance far from the camera. Accordingly, imaging device 11 is provided in the vehicle body of vehicle 1 to be tilted downward with respect to a direction that is parallel to the ground, in order to image an area near vehicle 1 on the ground. For example, as illustrated in FIG. 3(a), an orientation of imaging device 11 is set in such a way that a vanishing point is located in a center of a screen.

Figure 3:
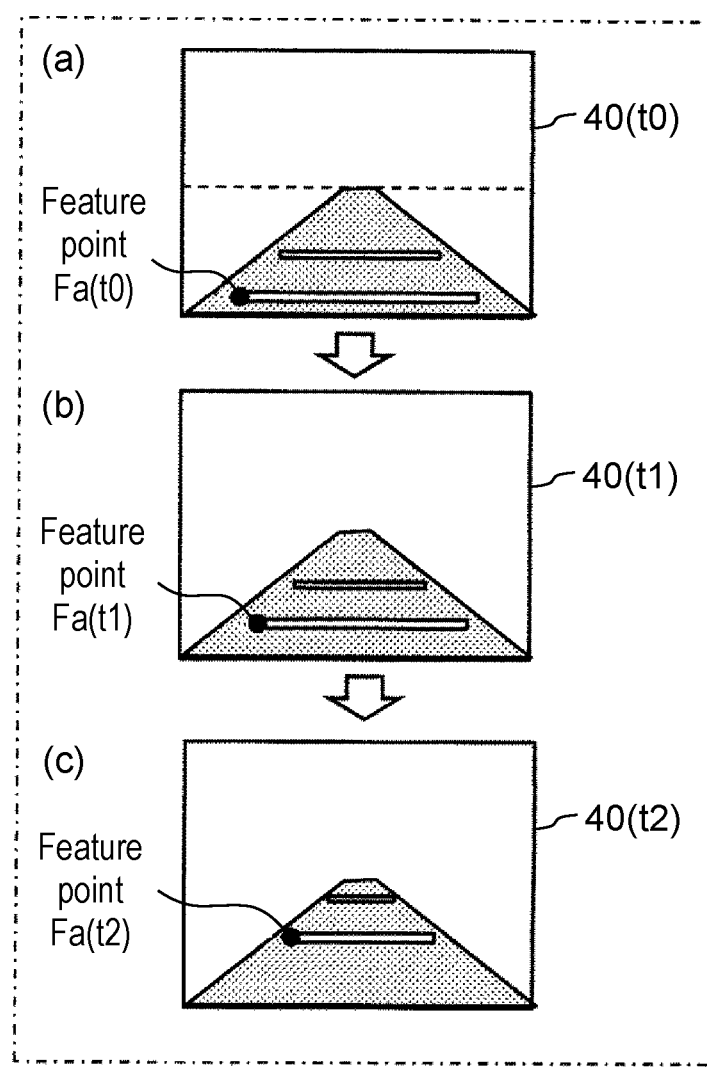
FIG. 3 is a diagram illustrating a series of images captured by imaging device 11 of FIG. 1, part (a) illustrates image $40(t0)$ at time t0, part (b) illustrates image $40(t1)$ at time t1, and part (c) illustrates image $40(t2)$ at time t2.

FIG. 3 is a diagram illustrating a series of images captured by imaging device 11 of FIG. 1. When vehicle 1 is moving forward, imaging device 11 images the rear side of vehicle 1 at predetermined time intervals (for example, times t0, t1, t2, . . . ). FIG. 3(*a*) illustrates image 40(*t*0) at time t0, FIG. 3(*b*) illustrates image 40(*t*1) at time t1, and FIG. 3(*c*) illustrates image 40(*t*2) at time t2. In image 40(*t*0) of FIG. 3(*a*), feature point Fa(t0) is detected from a pattern on the ground near vehicle 1. In image 40(*t*1) of FIG. 3(*b*), a pattern on the ground that has been detected as feature point Fa(t0) moves from a position at time t0 in accordance with a movement of vehicle 1, and is detected as feature point Fa(t1) that corresponds to feature point Fa(t0). Similarly, in image 40(*t*2) of FIG. 3(*c*), a pattern on the ground that has been detected as feature point Fa(t1) moves from a position at time t1 in accordance with a movement of vehicle 1, and is detected as feature point Fa(t2) that corresponds to feature point Fa(t1). As described above, a feature point can be tracked from time t0 to time t2.

Figure 4:
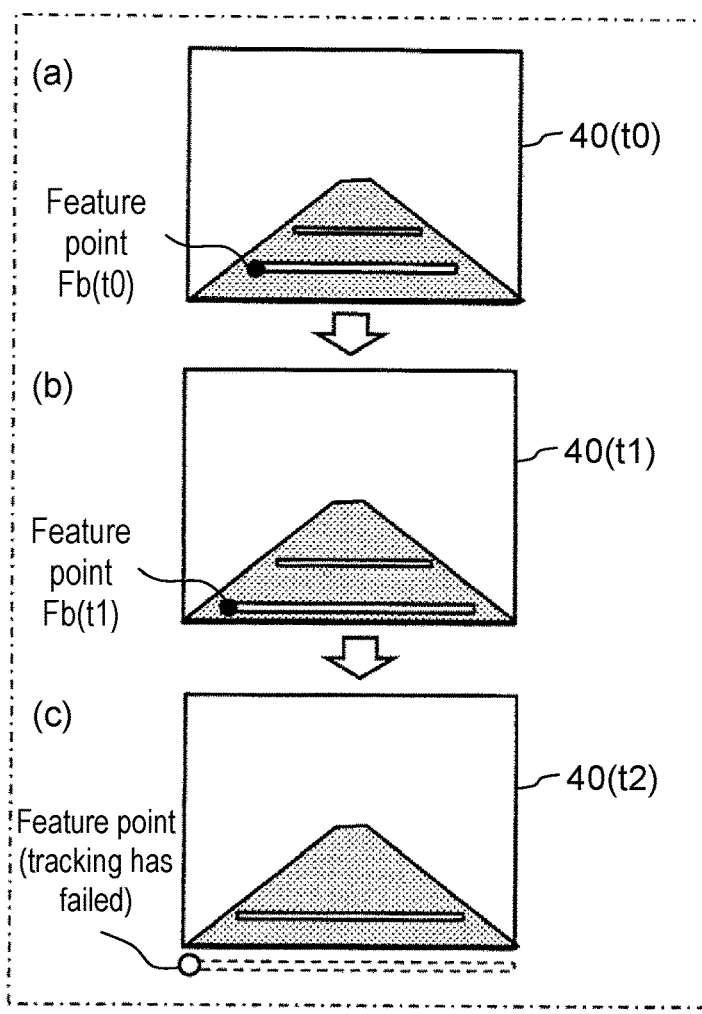
FIG. 4 is a diagram illustrating a series of images captured by an imaging device of a comparative example, part (a) illustrates image $40(t0)$ at time t0, part (b) illustrates image $40(t1)$ at time t1, and part (c) illustrates image $40(t2)$ at time t2.

FIG. 4 is a diagram illustrating a series of images captured by an imaging device of a comparative example. FIG. 4 illustrates an example in a case where an imaging device is installed in a vehicle body of vehicle 1 to image a front side of vehicle 1. When vehicle 1 is moving forward, the imaging device images the front side of vehicle 1 at predetermined time intervals (for example, times t0, t1, t2, . . . ). FIG. 4(*a*) illustrates image 40(*t*0) at time t0, FIG. 4(*b*) illustrates image 40(*t*1) at time t1, and FIG. 4(*c*) illustrates image 40(*t*2) at time t2. In image 40(*t*0) of FIG. 4(*a*), feature point Fb(t0) is detected from a pattern on the ground that is somewhat close to vehicle 1. In image 40(*t*1) of FIG. 4(*b*), a pattern on the ground that has been detected as feature point Fb(t0) moves from a position at time t0 in accordance with a movement of vehicle 1, and is detected as feature point Fb(t1) that corresponds to feature point Fb(t0). In image 40(*t*2) of FIG. 4(*c*), a pattern on the ground that has been detected as feature point Fb(t1) moves outward from a screen in accordance with a movement of vehicle 1, and it becomes impossible to track feature point Fb(t1).

In FIG. 4, in a case where the imaging device images the front side of vehicle 1, a feature point gradually approaches vehicle 1. Therefore, precision of calculating a position and an orientation of vehicle 1 based on a feature point is highest at a moment at which the feature point is closest to vehicle 1. Immediately after this, it becomes impossible to track the feature point. In contrast, in FIG. 3, in a case where imaging device 11 images the rear side of vehicle 1, a feature point gradually moves farther from vehicle 1. Therefore, the position and the orientation of vehicle 1 can be calculated with high precision when the feature point is first detected, and then, the feature point can be tracked during a relatively long time period. As described above, in a case where imaging device 11 images the rear side of vehicle 1, the position and the orientation of vehicle 1 can be calculated with high precision in comparison with a case where the front side of vehicle 1 is imaged. In consideration of this characteristic, the present exemplary embodiment is characterized in that imaging device 11 is installed in the vehicle body of vehicle 1 to image the rear side of vehicle 1.

Next, an operation of feature point extractor 31 is described in detail.

Figure 5:
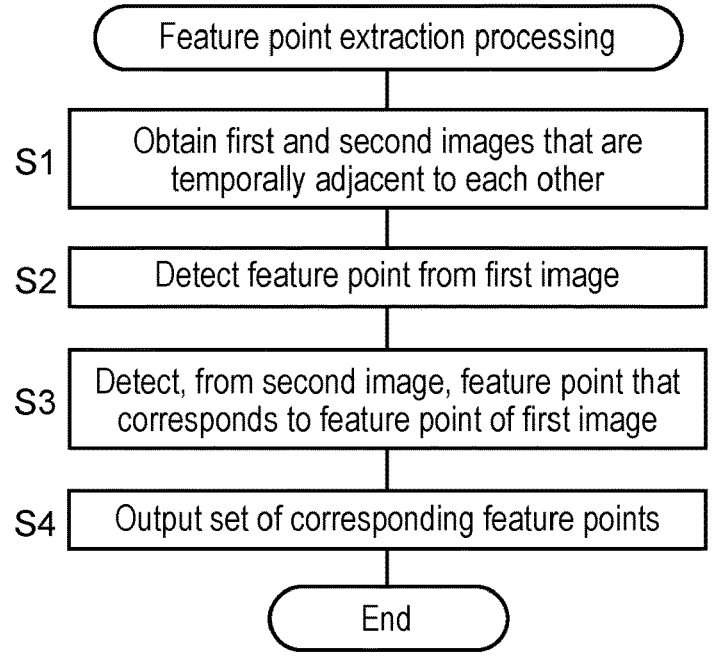
FIG. 5 is a flowchart illustrating feature point extraction processing performed by feature point extractor 31 of FIG. 2.

FIG. 5 is a flowchart illustrating feature point extraction processing performed by feature point extractor 31 of FIG. 2.

In step S1, feature point extractor 31 obtains, from imaging device 11, first and second images that have respectively been captured at first time and second time that are separated from each other by a predetermined time (for example, first and second images of frames that are temporally adjacent to each other).

In step S2, feature point extractor 31 detects a feature point from the first image. In order to detect a feature point from an image, for example, features from accelerated segment test (FAST) described in NPL 1 may be used.

In step S3, feature point extractor 31 detects, from the second image, a feature point that corresponds to the feature point in the first image. In order to detect feature points that correspond to each other in images, for example, the Kanade-Lucas-Tomasi (KLT) tracker described in NPL 2 may be used.

Figure 6:
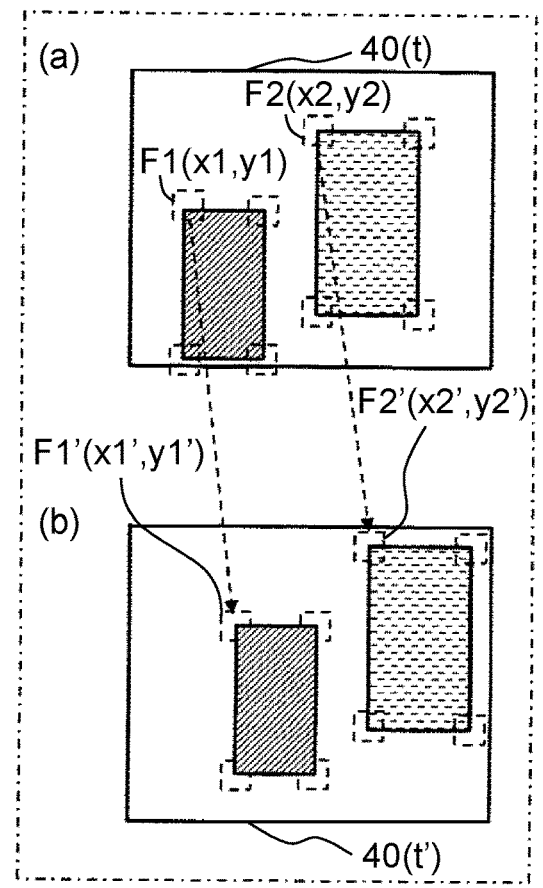
FIG. 6 is a diagram illustrating feature points extracted by feature point extractor 31 of FIG. 2, part (a) illustrates feature points F1, F2 that are extracted from image $40(t)$ at time t, and part (b) illustrates feature points F1', F2' that are extracted from image $40(t')$ at time t'.

FIG. 6 is a diagram illustrating feature points detected by feature point extractor 31 of FIG. 2. FIG. 6(*a*) illustrates feature points F1, F2 that are extracted from image 40(*t*) at time t, and FIG. 6(*b*) illustrates feature points F1', F2' that are extracted from image 40(*t*') at time t'. Feature point F1 in FIG. 6(*a*) has coordinates (x1, y1), and feature point F2 has coordinates (x2, y2). Feature point F1' in FIG. 6(*b*) has coordinates (x1', y1'), and feature point F2' has coordinates (x2', y2'). Feature points F1', F2' in FIG. 6(*b*) respectively correspond to feature point F1, F2 in FIG. 6(*a*).

In step S4 of FIG. 5, feature point extractor 31 outputs a set of coordinates of feature points that correspond to each other in the first and second images. Feature point extractor 31 outputs, for example, set (x1, y1, x1', y1') of coordinates of feature points F1, F1', and outputs set (x2, y2, x2', y2') of coordinates of feature points F2, F2'.

Next, an operation of position calculator 32 is described in detail.

Figure 7:
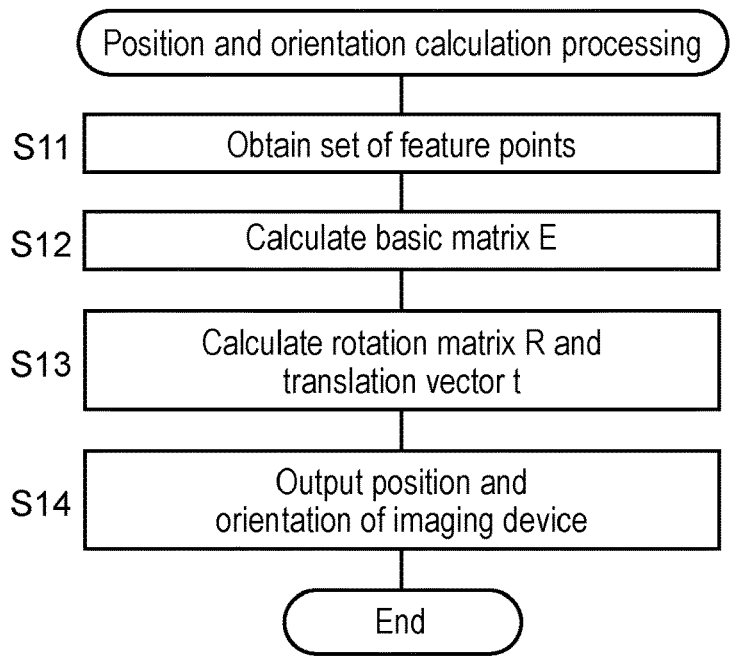
FIG. 7 is a flowchart illustrating position and orientation calculation processing performed by position calculator 32 of FIG. 2.

FIG. 7 is a flowchart illustrating position and orientation calculation processing performed by position calculator 32 of FIG. 2.

In step S11, position calculator 32 obtains, from feature point extractor 31, at least five sets of coordinates of feature points that correspond to each other in the first and second images.

In step S12, position calculator 32 calculates basic matrix E including 3×3 elements based on the coordinates of the feature points that have been obtained in step S11. In order to calculate basic matrix E, for example, the five-point algorithm described in NPL 3 may be used.

In step S13, position calculator 32 performs singular value decomposition on basic matrix E to calculate rotation matrix R and translation vector t that indicate a movement of vehicle 1 between times at which the first and second images have been captured. Rotation matrix R indicates a change in an orientation of vehicle 1 between the times at which the first and second images have been captured. Translation vector t indicates a change in a position of vehicle 1 between the times at which the first and second images have been captured.

Calculation of rotation matrix R and translation vector t is formulated as described below by referring to, for example, NPL 4.

Singular value decomposition is performed on basic matrix E, and basic matrix E is expressed as $E = U\Sigma V^T$. In this formula, $\Sigma$ is diagonal matrix $\Sigma$ including 3×3 elements, and U and V are orthogonal matrices including 3×3 elements.

Rotation matrix R is calculated in such a way that $R = UW^{-1}V^T$, by using matrix W including 3×3 elements, as expressed in the following formula.

$$W = \begin{pmatrix} 0 & -1 & 0 \\ 1 & 0 & 0 \\ 0 & 0 & 1 \end{pmatrix} \quad \text{[Formula 1]}$$

In addition, in order to calculate translation vector t, matrix T including 3×3 elements is calculated in such a way that matrix $T=VW\Sigma V^T$. Matrix T satisfies E=TR, and is expressed by the following formula.

$$T = \begin{pmatrix} 0 & -t_z & t_y \\ t_z & 0 & -t_x \\ -t_y & t_x & 0 \end{pmatrix} \quad \text{[Formula 2]}$$

Translation vector t is expressed using components of matrix T in such a way that $t=(t_x, t_y, t_z)^T$.

In step S14, position calculator 32 calculates and outputs the position and the orientation of vehicle 1. When vehicle 1 has position t(n−1) and orientation R(n−1) at most recent time n−1, position t(n) of vehicle 1 at current time n is expressed using translation vector t calculated in step S13 in such a way that t(n)=t(n−1)+tR(n−1). In addition, orientation R(n) of vehicle 1 at current time n is expressed using rotation matrix R calculated in step S13 in such a way that R(n)=RP(n−1). As described above, position calculator 32 cumulatively adds a plurality of translation vectors, and cumulatively multiplies a plurality of rotation matrices, and therefore position calculator 32 can calculate a position and an orientation of vehicle 1 by using, as a reference, an initial position and an initial orientation that have been predetermined.

Note that an imaging device that only includes a monocular camera fails to convert the calculated position of vehicle 1 into meters. In a case where imaging device 11 is a stereo camera including two cameras, stereo matching is performed on the same feature point, and the position of vehicle 1 is converted into meters based on a distance between the two cameras and focuses that have been measured in advance. In a case where imaging device 11 includes a depth sensor or a ToF sensor, the position of vehicle 1 can be directly obtained in meters.

A position and an orientation that are calculated in the position and orientation calculation processing of FIG. 7 indicate a relative position and a relative orientation that use, as an origin, a feature point that has been extracted from an image captured in a movement start position of vehicle 1. Accordingly, an initial position and an initial orientation that are viewed from an origin of coordinates in a map are obtained in advance, and the initial position and the initial orientation are respectively added to the relative position and the relative orientation. Therefore, the relative position and the relative orientation can be converted into a position and an orientation on the map (also referred to as an "absolute position" and an "absolute orientation").

Position calculator 32 may express the calculated position of vehicle 1 by using, for example, orthogonal coordinates (XYZ coordinates). Position calculator 32 may calculate a speed and/or an acceleration of vehicle 1 based on the calculated position of vehicle 1 and time. Position calculator 32 may express the calculated orientation of vehicle 1 by using roll, pitch, and yaw. By doing this, in addition to the orientation of vehicle 1 in a horizontal plane that is parallel to the ground, an inclination of the vehicle body of vehicle 1 can be expressed, or a movement in a height direction of vehicle 1 can be expressed.

In the feature point extraction processing of FIG. 5, an example using FAST and the KLT tracker has been described, but another method may be used. For example, feature point detection processing, feature point matching processing, and the like that use scale invariant feature transform (SIFT) or oriented FAST and rotated BRIEF (ORB) that is a general method in image processing, may be used.

In the position and orientation calculation processing of FIG. 7, calculation of the orientation of vehicle 1 may be corrected by using an orientation sensor such as an inertial measurement unit (IMU). For example, when vehicle 1 is rotating in a yaw direction at high speed, a number of feature points that are common among images decreases, and precision of a position and an orientation that are calculated deteriorates. Accordingly, in a case where vehicle 1 is rotating in the yaw direction at high speed, the orientation of vehicle 1 may be estimated by using an angular velocity of the IMU.

In the position and orientation calculation processing of FIG. 7, calculation of a position at the time of straight traveling of vehicle 1 may be corrected based on information relating to rotation angles of wheels of vehicle 1. For example, when vehicle 1 is moving straight, a position of vehicle 1 can be calculated with high precision based on rotation angles of wheels. Accordingly, when right-hand and left-hand wheels of vehicle 1 have the same rotation speed, it may be considered that vehicle 1 is moving straight. Then, movement distance 2πrn of vehicle 1 may be calculated by using a product of diameter 2r of the wheels and rotation speed n of the wheels, and a position of vehicle 1 may be estimated.

By employing vehicle 1 of FIG. 1, imaging device 11 is proved in vehicle 1 to image a rear side of vehicle 1. This enables a position of vehicle 1 to be measured using an imaging device with higher precision than in a conventional technique. In addition, by employing vehicle 1 of FIG. 1, imaging device 11 is provided in vehicle 1 to image a rear side of vehicle 1, and this enables a position and an orientation of vehicle 1 to be calculated with high precision when a feature point is first detected. Then, the feature point can be tracked during a relatively long time period. Therefore, a position and an orientation of vehicle 1 can be calculated with high precision in comparison with a case where a front side of vehicle 1 is imaged. In addition, by employing vehicle 1 of FIG. 1, imaging device 11 is provided in vehicle 1 to image the rear side of vehicle 1. This can avoid easily shielding a field of view of imaging device 11 even when vehicle 1 has a structure in which a load is mounted on a front side of a vehicle body, similarly to a load carrying robot.

Vehicle 1 is not limited to the load carrying robot, and may be an arbitrary vehicle that carries load 3. Vehicle 1 may be, for example, a forklift that is mounted with a load on a front side of a vehicle body. Imaging device 11 is provided in vehicle 1 to image a rear side of vehicle 1, and this can avoid easily shielding a field of view of imaging device 11 even if vehicle 1 is mounted with a load in a fork on the front side of the vehicle body. In addition, vehicle 1 may be mounted with a load on a rear side of vehicle 1, similarly to a truck.

A positioning system according to the first exemplary embodiment may use a signal source that is provided in a known fixed position outside a vehicle to generate a position signal associated with the fixed position, and may correct a position of the vehicle based on this position signal, as described below.

Next, a first variation of the first exemplary embodiment is described with reference to FIGS. 8 to 12. In the first variation of the first exemplary embodiment, a wireless transmitter, such as a radio frequency identification (RFID) tag, that is provided in a known fixed position outside a vehicle is used as a signal source, a position signal associated with the fixed position is generated, and a position of the vehicle is corrected based on this position signal.

Figure 8:
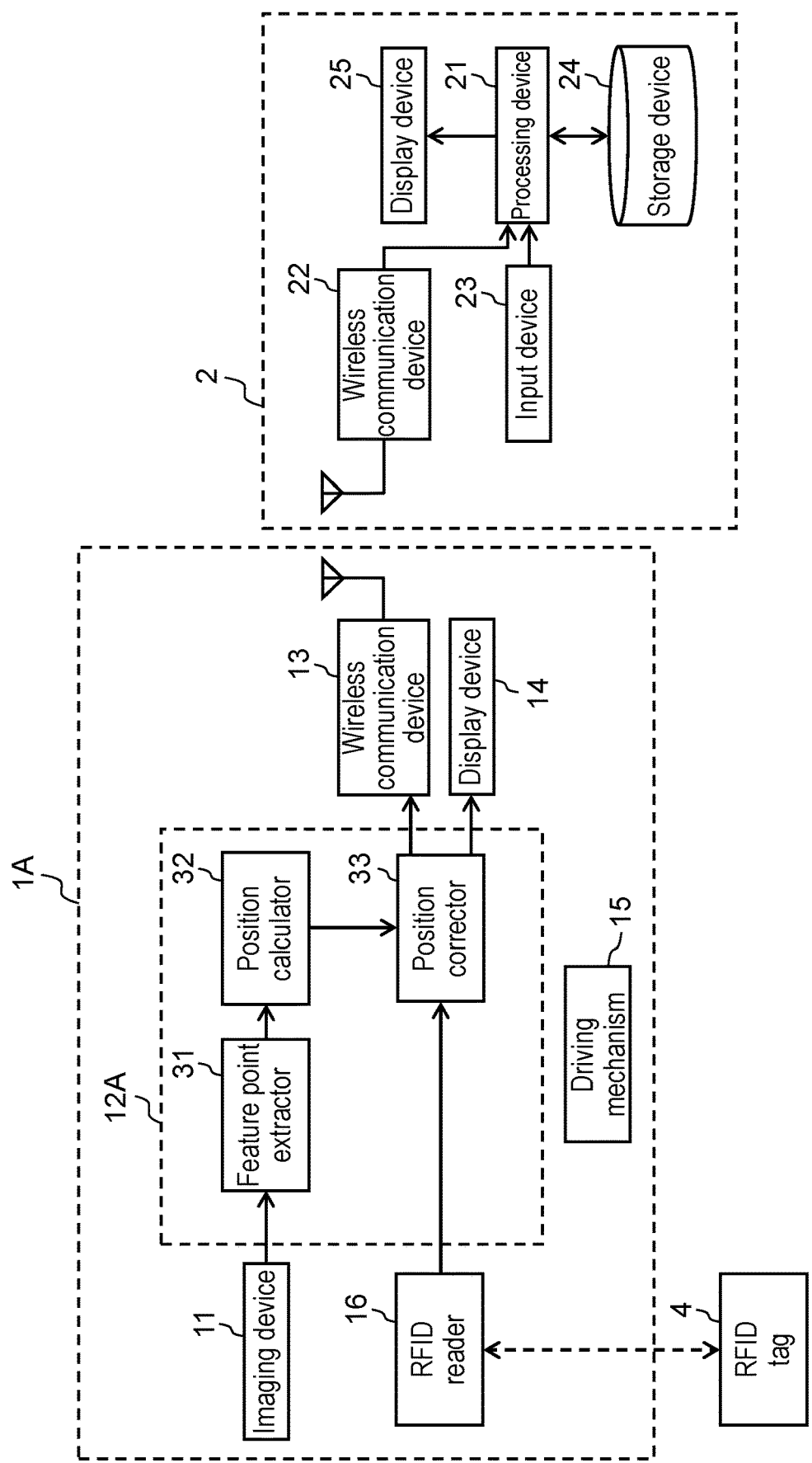
FIG. 8 is a block diagram illustrating a configuration of a positioning system including vehicle 1A in a first variation of the first exemplary embodiment.

FIG. 8 is a block diagram illustrating a configuration of a positioning system including vehicle 1A in the first variation of the first exemplary embodiment. The positioning system of FIG. 8 includes at least one vehicle 1A, server 2, and at least one RFID tag 4.

RFID tag 4 is a wireless transmitter (a signal source) that is provided in a known fixed position outside vehicle 1A and transmits an identification signal (ID) that is associated with the fixed position. A position and an orientation (also referred to as an "absolute position" and an "absolute orientation") of RFID tag 4 are measured in advance, and are associated with a map. RFID tag 4 has a known position and a known orientation on the map. Therefore, a position and an orientation of RFID tag 4 on the map can be specified based on the identification signal (ID).

Vehicle 1A includes processing device 12A instead of processing device 12 in vehicle 1 of FIG. 2, and further includes RFID reader 16.

RFID reader 16 is a position signal generator that performs communication with RFID tag 4 and generates a position signal that is associated with the fixed position of RFID tag 4. RFID reader 16 includes a wireless receiver that receives the identification signal (ID) from RFID tag 4, and a storage device that stores the position and the orientation of RFID tag 4, and RFID reader 16 generates a position signal based on the identification signal. The position signal includes a position and an orientation of RFID tag 4 that has transmitted the identification signal, and time at which the identification signal has been received.

Processing device 12A includes position corrector 33 in addition to feature point extractor 31 and position calculator 32 in processing device 12 of FIG. 2. Position corrector 33 corrects a position and an orientation (a relative position and a relative orientation) that have been calculated by position calculator 32 based on the position and the orientation (the absolute position and the absolute orientation) of RFID tag 4 that are included in the position signal.

Figure 9:
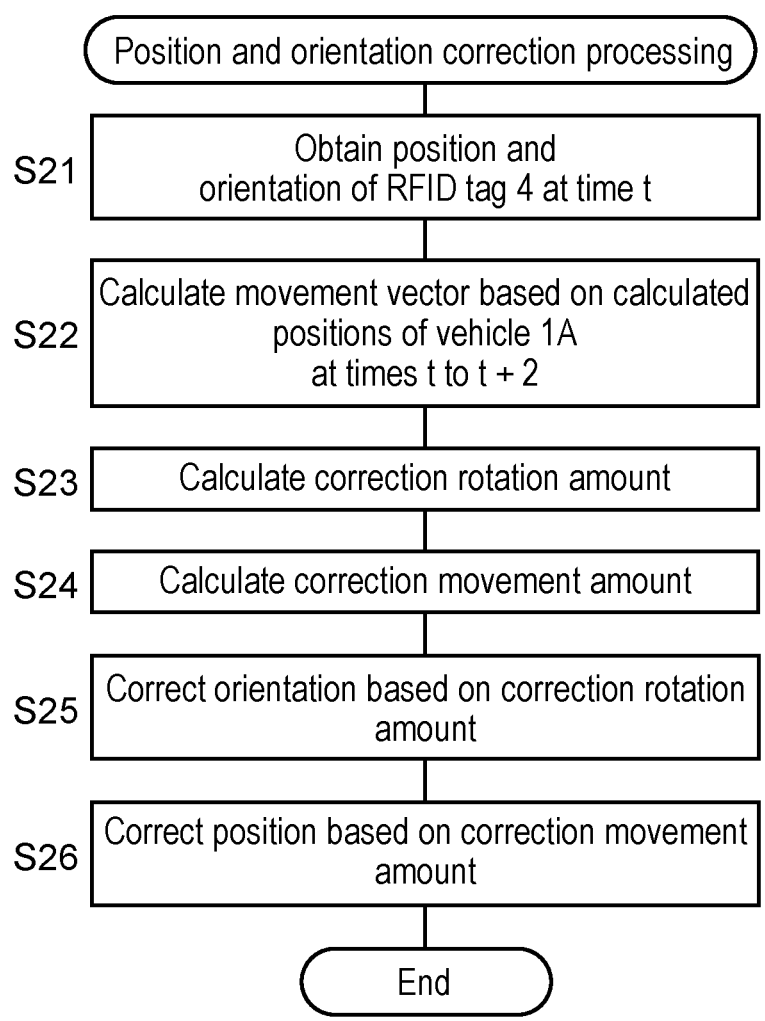
FIG. 9 is a flowchart illustrating position and orientation correction processing performed by position corrector 33 of FIG. 8.

FIG. 9 is a flowchart illustrating position and orientation correction processing performed by position corrector 33 of FIG. 8.

In step S21, position corrector 33 obtains, from RFID reader 16, a position and an orientation of RFID tag 4 at time t.

Figure 10:
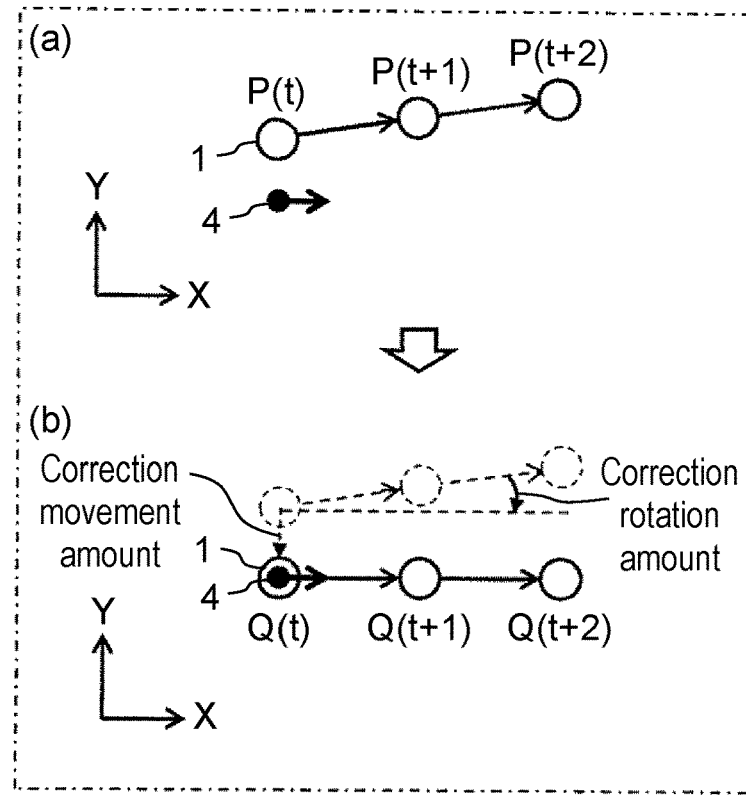
FIG. 10 is a diagram illustrating a position and an orientation of vehicle 1A that are corrected by position corrector 33 of FIG. 8, part (a) illustrates position P of vehicle 1A before correction, and part (b) illustrates position Q of vehicle 1A after correction.

FIG. 10 illustrates a position and an orientation of vehicle 1A that are corrected by position corrector 33 of FIG. 8. FIG. 10(a) illustrates position P of vehicle 1A before correction, and FIG. 10(b) illustrates position Q of vehicle 1A after correction. Vehicle 1A moves through a predetermined route in a factory or a warehouse, and passes through the vicinity of RFID tag 4 (substantially, a position of RFID tag 4). As illustrated in FIG. 10(a), vehicle 1A actually passes through the position of RFID tag 4. However, in some cases, due to an error of a position and an orientation that have been calculated by position calculator 32, it is determined that vehicle 1A is located at points P(t), P(t+1), and P(t+2).

In step S22 of FIG. 9, position corrector 33 calculates a movement vector based on positions P(t), P(t+1), and P(t+2) of vehicle 1A that have been calculated by position calculator 32 at times t to t+2. By doing this, an orientation of a vector that passes through point P(t) and point P(t+2) can be obtained.

In step S23, position corrector 33 calculates a correction rotation amount based on the movement vector calculated in step S22 and an angle of a vector indicating the orientation of RFID tag 4 at time t.

In step S24, position corrector 33 calculates a correction movement amount based on a difference between position P(t) of vehicle 1A that has been calculated by position calculator 32 at time t and the position of RFID tag 4 at time t.

In step S25, position corrector 33 correct an orientation based on the correction rotation amount. Specifically, position corrector 33 substrates a coordinate value of relative position P(t) at time t from coordinate values of respective relative positions at time t and times that follow, and rotates coordinate values after subtraction by the correction rotation amount.

In step S26, position corrector 33 correct a position based on the correction movement amount. Specifically, position corrector 33 adds the correction movement amount to coordinate values obtained due to rotation in step S25, and further adds the coordinate value of relative position P(t) at time t to coordinate values after addition.

Figure 11:
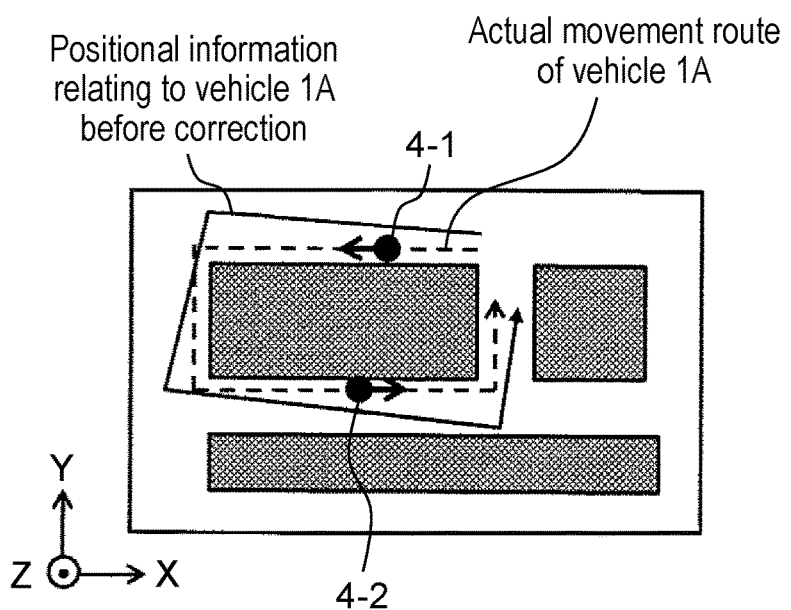
FIG. 11 is a diagram illustrating positional information relating to vehicle 1A before correction performed by position corrector 33 of FIG. 8.
Figure 12:
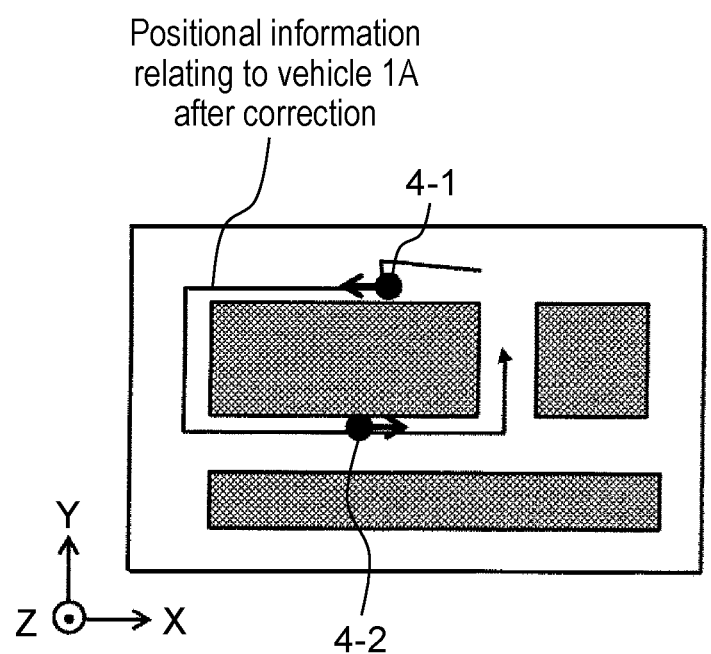
FIG. 12 is a diagram illustrating positional information relating to vehicle 1A after correction performed by position corrector 33 of FIG. 8.

FIG. 11 is a map indicating positional information relating to vehicle 1A before correction performed by position corrector 33 of FIG. 8. FIG. 12 is a map indicating positional information relating to vehicle 1A after correction performed by position corrector 33 of FIG. 8. Each of reference marks 4-1 and 4-2 indicates an RFID tag. Vehicle 1A is actually moving straight along a wall. However, in some cases, due to an error of a position and an orientation that have been calculated by position calculator 32, it is determined that vehicle 1A is moving through a solid-line route of FIG. 11, if correction is not performed. By using RFID tag 4, a route of vehicle 1A is corrected, as illustrated in FIG. 12.

By employing vehicle 1A of FIG. 8, a position and an orientation of vehicle 1A are corrected by using RFID tag 4. This enables the position and the orientation of vehicle 1A to be more accurately recognized.

Next, a second variation of the first exemplary embodiment is described with reference to FIGS. 13 to 16. In the second variation of the first exemplary embodiment, a marker (an identification image) that has been formed in a known fixed position outside a vehicle is used, a position signal associated with the fixed position is generated, and a position of the vehicle is corrected based on this position signal.

Figure 13:
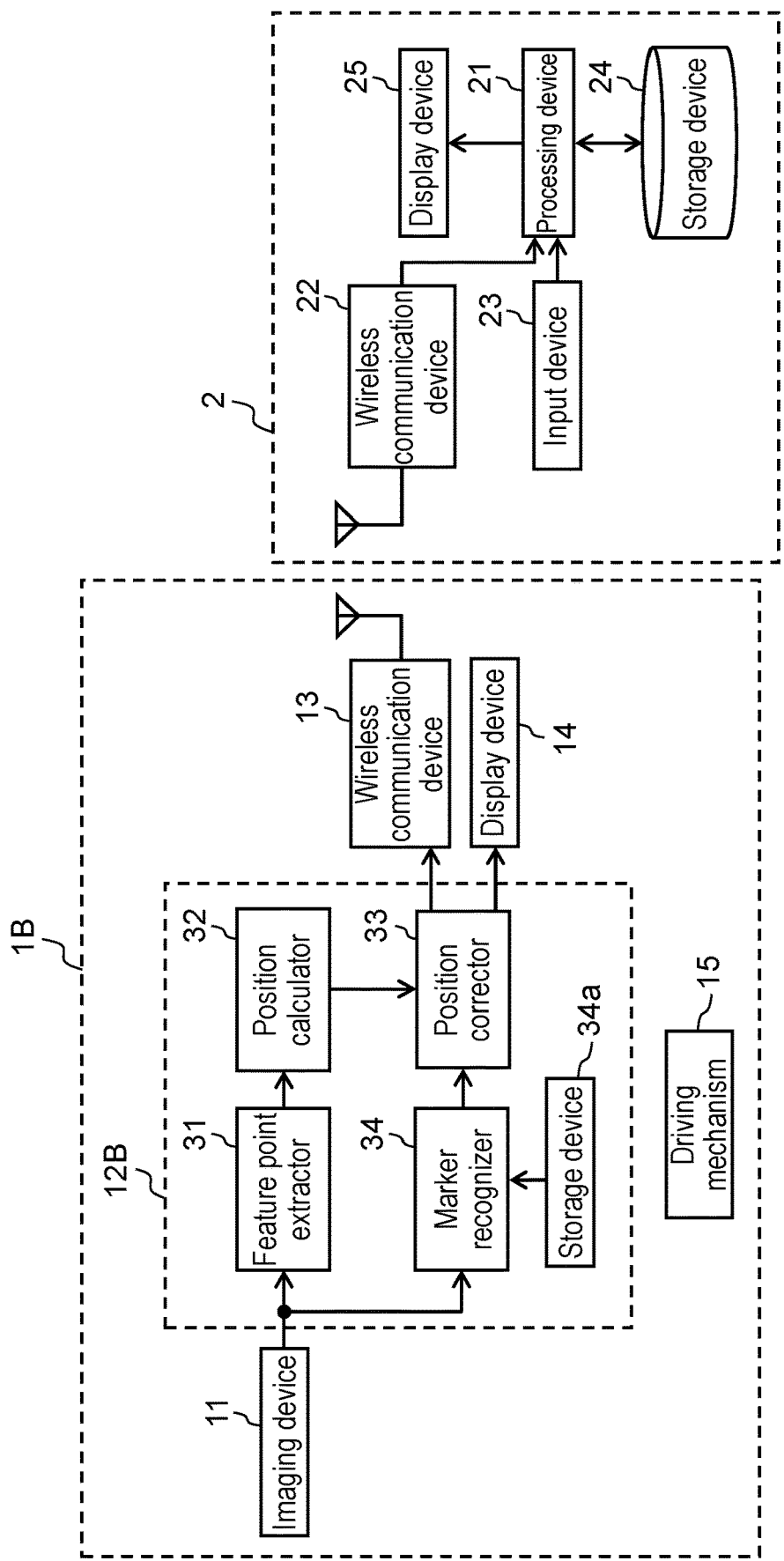
FIG. 13 is a block diagram illustrating a configuration of a positioning system including vehicle 1B in a second variation of the first exemplary embodiment.

FIG. 13 is a block diagram illustrating a configuration of a positioning system including vehicle 1B in the second variation of the first exemplary embodiment. The positioning system of FIG. 13 includes at least one vehicle 1B and server 2.

Vehicle 1B includes processing device 12B instead of processing device 12 in vehicle 1 of FIG. 2. Processing device 12B includes marker recognizer 34 and storage device 34a in addition to feature point extractor 31, position calculator 32, and position corrector 33 in processing device 12A of FIG. 8. Marker recognizer 34 is a position signal generator that performs general image processing to recognize a marker that has been formed in a known fixed position outside vehicle 1 from an image captured by imaging device 11, and generates a position signal that is associated with the fixed position of the marker. The marker is, for example, an identification image including a plurality of rectangles or a plurality of dots that is disposed two-dimensionally. The identification image including the plurality of rectangles may be, for example, a quick response (QR) code (registered trademark), an augmented reality (AR) code, or the like. The identification image including the plurality of dots may be, for example, an image including dots that are disposed at random, as disclosed in NPL 5. Marker recognizer 34 includes an image recognizer that recognizes a marker from an image captured by imaging device 11, and generates a position signal based on the marker. Storage device 34a stores positional information indicating a position of a marker and orientation information indicating an orientation of the marker. The position signal includes a position and an orientation of a marker, and time at which the marker has been imaged. Storage device 34a includes a solid-state drive, a hard disk drive, or the like.

Figure 14:
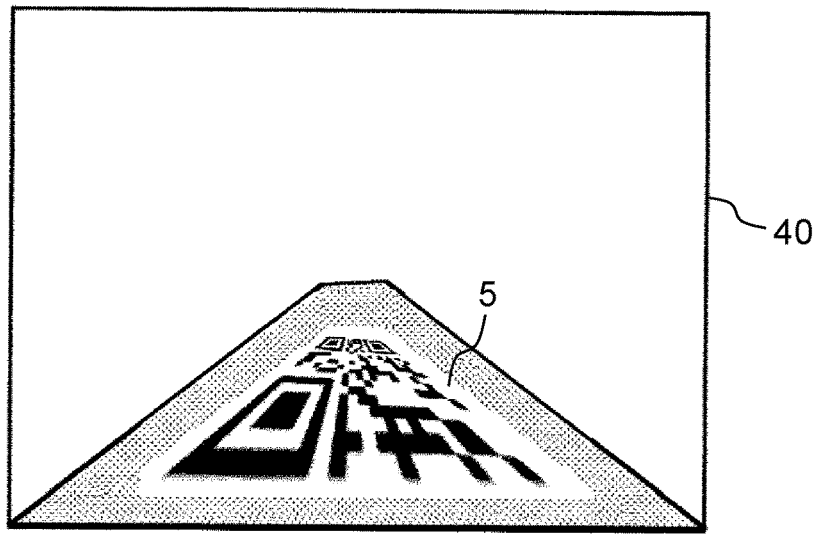
FIG. 14 is a diagram illustrating a first example of image 40 captured by imaging device 11 of FIG. 13.
Figure 15:
FIG. 15 is a diagram illustrating marker 5' obtained by correcting marker 5 of FIG. 14.

FIG. 14 is a diagram illustrating a first example of image 40 captured by imaging device 11 of FIG. 13. FIG. 15 is a diagram illustrating marker 5' obtained by correcting marker 5 of FIG. 14. In a case where marker 5 has been formed on the ground, imaging device 11 provided in a vehicle body of vehicle 1B images marker 5 in a distorted state, as illustrated in FIG. 14. Therefore, marker recognizer 34 may perform general image processing to correct imaged marker 5, and may generate corrected marker 5', as illustrated in FIG. 15.

Position corrector 33 corrects a position and an orientation (a relative position and a relative orientation) that have been calculated by position calculator 32 based on a position and an orientation (an absolute position and an absolute orientation) of a marker that are included in the position signal. Details of position and orientation correction processing performed by position corrector 33 are similar to details of position and orientation correction processing using RFID tag 4 that have been described with reference to FIG. 9.

In a case where a QR code and an AR code are used, marker recognizer 34 can simultaneously obtain a position and an orientation of a marker viewed from imaging device 11. Accordingly, the position and the orientation of the marker viewed from imaging device 11 can be converted into a position and an orientation of imaging device 11 viewed from the marker, by using the following formula.

$$X_W = \begin{pmatrix} R^{-1} & -R^{-1}t \\ 0^T & 1 \end{pmatrix} X_C \quad \text{[Formula 3]}$$

In this formula, $X_W$ indicates a coordinate system of imaging device 11 viewed from a marker. $X_C$ indicates a coordinate system of the marker viewed from imaging device 11. R and t indicate the rotation matrix and the translation vector that have been described above (stated another way, an orientation and a position of the marker viewed from imaging device 11). $0^T$ indicates a zero vector including 1×3 elements.

By adding the position and the orientation of imaging device 11 viewed from the marker to the position and the orientation of the marker, an absolute position and an absolute orientation of vehicle 1B can be obtained. Marker recognizer 34 or position corrector 33 may calculate the absolute position and the absolute orientation of vehicle 1B, as described above.

Figure 16:
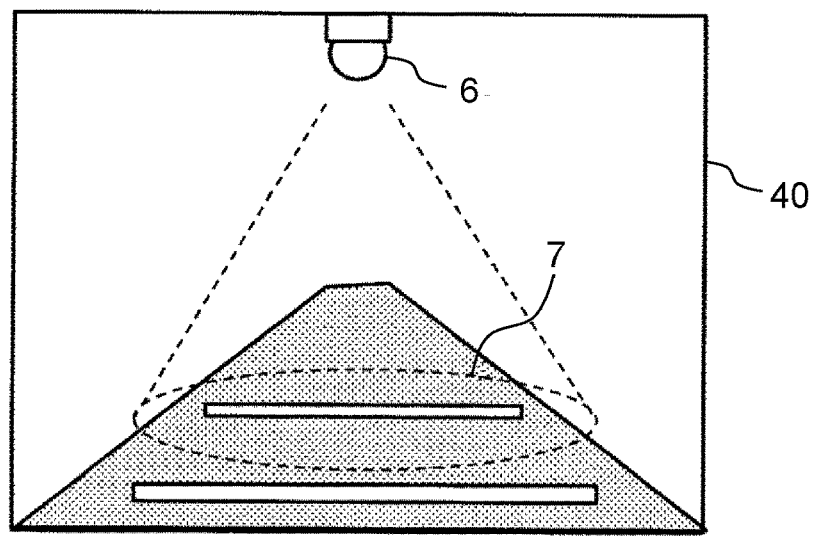
FIG. 16 is a diagram illustrating a second example of image 40 captured by imaging device 11 of FIG. 13.

FIG. 16 is a diagram illustrating a second example of image 40 captured by imaging device 11 of FIG. 13. An identification image may be pattern 7 having a luminance that temporally changes instead of a static marker that does not temporally change. For example, similarly to optical ID, identification information may be read from a temporal change in a gradation pattern in an image, and a position and an orientation of vehicle 1B may be corrected. For example, illumination device 6 may apply pattern 7 having a luminance that temporally changes in a certain position on a movement route of vehicle 1B. Vehicle 1B causes imaging device 11 to image an area that has been irradiated by illumination device 6, during every predetermined period, and therefore vehicle 1B causes imaging device 11 to obtain pattern 7 having a luminance that temporally changes. By doing this, vehicle 1B can correct a position and an orientation of vehicle 1B similarly to a case using a marker.

In order to image a marker or a pattern, vehicle 1B of FIG. 13 may use a dedicated additional imaging device that images a front side, a side (such as a wall), or an upper side (such as a ceiling), without sharing imaging device 11.

Marker recognizer 34 (an example of a recognizer) may recognize marker 5 that is disposed in a known fixed position outside vehicle 1B, from image 40 captured by imaging device 11. Then, marker recognizer 34 may calculate a relative positional relationship between marker 5 and imaging device 11. In this case, marker recognizer 34 recognizes, for example, four corners of marker 5, performs orientation calculation processing, and calculates rotation matrix R and translation vector t as the relative positional relationship between marker 5 and imaging device 11. In a general orientation calculation method, image coordinates (2D) of four corners of a marker in an image and three-dimensional coordinates (3D) of the four corners of the marker that have been obtained in advance are used, and a perspective-n-point (PnP) problem for obtaining an orientation and a position is solved using a correspondence between 2D and 3D. Storage device 34a stores positional information indicating a position of marker 5 and orientation information indicating an orientation of marker 5. Position corrector 33 may correct a position of vehicle 1B that has been calculated by position calculator 32, based on calculated translation vector t and the positional information relating to marker 5. In addition, position calculator 32 may calculate an orientation of vehicle 1B based on calculated rotation matrix R and the orientation information relating to marker 5. A QR code has been used as marker 5 here, but an AR code may be used. In addition, the QR code and the AR code may be printed on paper, or may be displayed on a display provided on a movement route of vehicle 1B.

According to the first exemplary embodiment, vehicles 1, 1A, 1B and server 2 may use a detachable storage medium, such as a secure digital (SD) card, instead of wireless communication device 13, 22. A position and an orientation of a vehicle that have been calculated in the vehicle may be written to the storage medium, and server 2 may read the position and the orientation of the vehicle from this storage medium.

By employing vehicle 1B of FIG. 13, a position and an orientation of vehicle 1B are corrected by using a marker or a pattern, and this enables the position and the orientation of vehicle 1B to be more accurately recognized.

According to the first exemplary embodiment, an imaging device is proved in a vehicle to image a rear side of the vehicle. This enables a position of the vehicle to be measured using the imaging device with higher precision than in a conventional technique. In addition, even in the case of a vehicle that includes a loading platform on a front side facing a traveling direction of the vehicle, a position of the vehicle can be measured with high precision without shielding a field of view of an imaging device due to a load.

According to the first exemplary embodiment, by using an imaging device, a position of a vehicle can be measured at a low cost even in a building, such as a factory or a ware house, in which radio waves from a GPS satellite fail to be received. A large number of wireless transmitters that transmit a wireless signal do not need to be provided, and this enables a reduction in a cost for initial introduction.

According to the first exemplary embodiment, business operations can be improved based on a movement route of a vehicle that is obtained from a positioning result.

The first exemplary embodiment can be utilized to determine, for example, whether maintenance needs to be performed or whether a lease contract needs to be updated, based on a movement distance of a vehicle.

According to the first exemplary embodiment, disposition of a passage, a shelf, or the like in a factory or a warehouse can be optimized based on a heat map indicating a movement of a vehicle.

According to the first exemplary embodiment, by visualizing places where vehicles pass each other, a route and a passage width can be reconsidered, and safety can be improved.

Second Exemplary Embodiment

A movement route, a movement distance, and the like of a vehicle can be obtained by tracking a position of the vehicle. Conventionally, a method has been proposed for regarding a movement distance of a vehicle as a work of the vehicle and determining whether maintenance needs to be performed on the vehicle based on the movement distance. However, a magnitude of a load imposed on a vehicle changes according to whether the vehicle is carrying loads. Therefore, it is impossible to accurately determine whether maintenance needs to be performed on the vehicle based on only a movement route and a movement distance of the vehicle (stated another way, a position of the vehicle). Accordingly, there is a request for a new index that more accurately indicates a work of a vehicle than a conventional index.

In a second exemplary embodiment, a vehicle monitoring device that monitors an operation of a vehicle and more accurately measures a work of the vehicle than a conventional device is provided.

Figure 17:
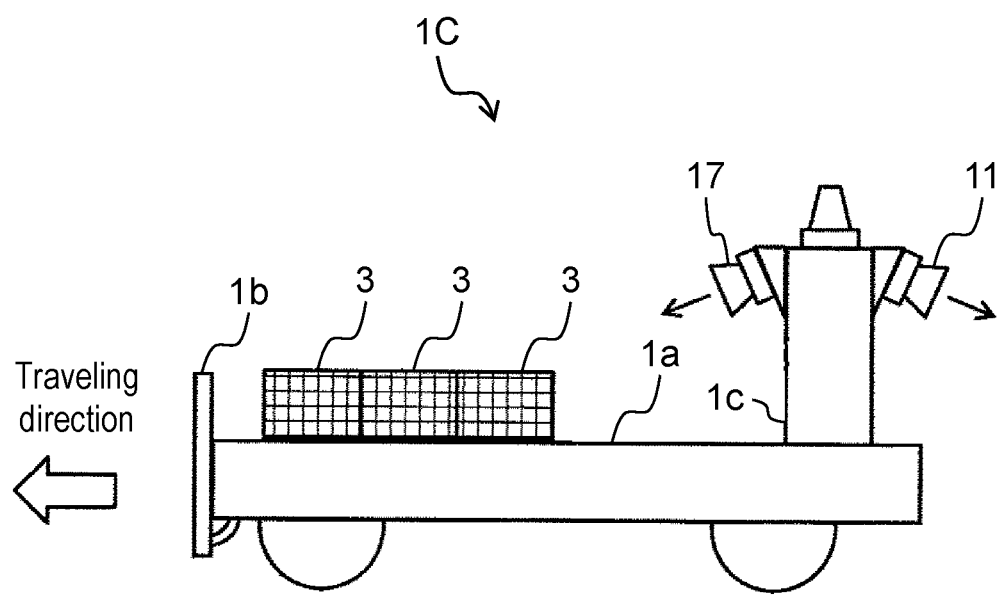
FIG. 17 is a schematic diagram illustrating a configuration of vehicle 1C according to a second exemplary embodiment.

FIG. 17 is a schematic diagram illustrating a configuration of vehicle 1C according to the second exemplary embodiment. Vehicle 1C is configured similarly to vehicle 1 of FIG. 1, and further includes imaging device 17 that images load 3 mounted on a loading platform.

Figure 18:
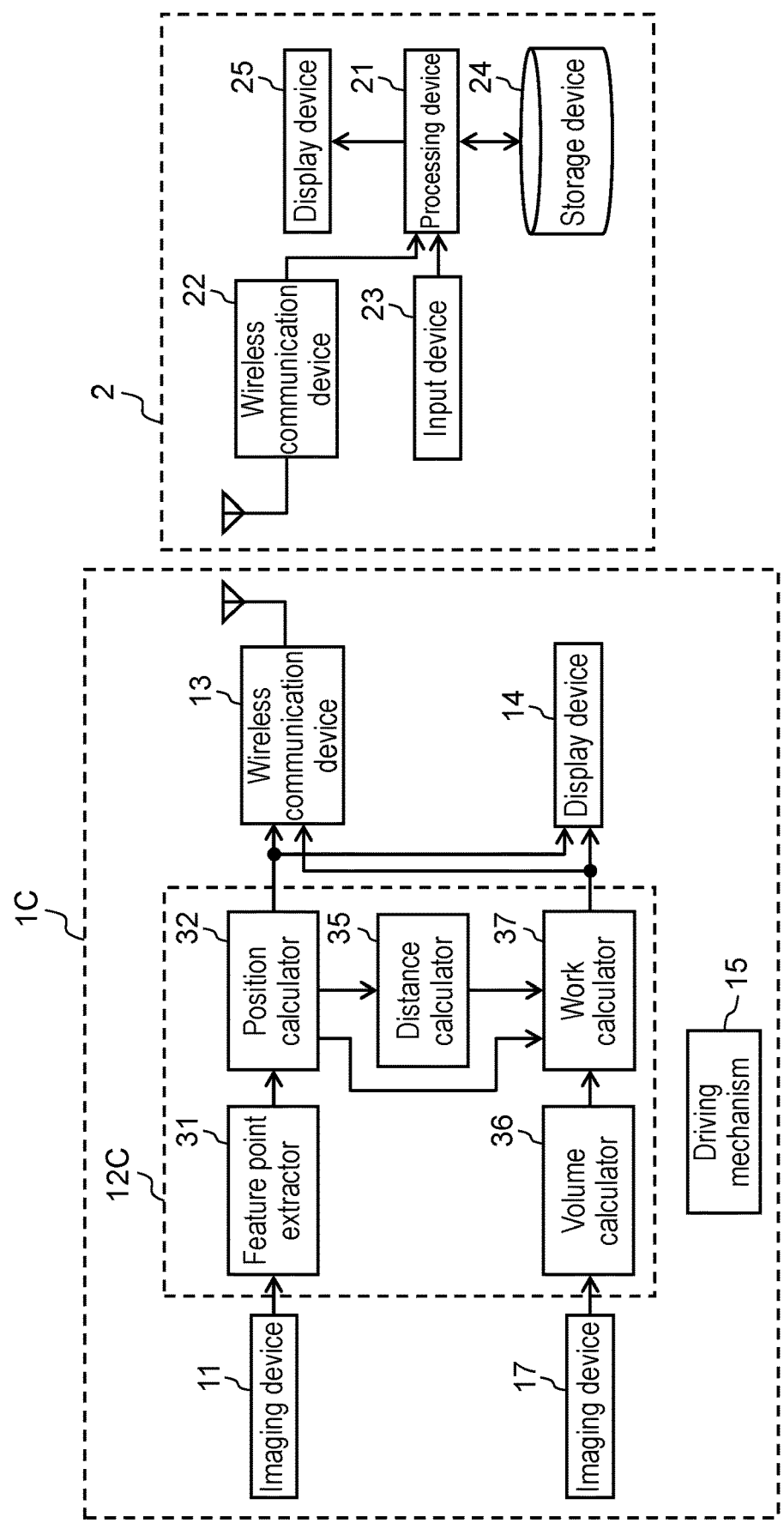
FIG. 18 is a block diagram illustrating a configuration of a vehicle monitoring system including vehicle 1C of FIG. 17.

FIG. 18 is a block diagram illustrating a configuration of a vehicle monitoring system including vehicle 1C of FIG. 17. A positioning system illustrated in FIG. 18 includes at least one vehicle 1C and server 2. Each of vehicles 1C includes a vehicle monitoring device that calculates a work of vehicle 1C. Server 2 obtains a work from each of vehicles 1, and records the work of each of vehicles 1.

Vehicle 1C includes processing device 12C instead of processing device 12 in vehicle 1 of FIG. 2, and further includes imaging device 17.

Imaging device 17 is provided in mast 1c or the like on a rear side of a vehicle body of vehicle 1 to image load 3 mounted on the loading platform, as described above. Imaging device 17 includes, for example, an RGB camera or a depth sensor.

Processing device 12C includes distance calculator 35, volume calculator 36, and work calculator 37 in addition to feature point extractor 31 and position calculator 32 in processing device 12 of FIG. 2. As described above, imaging device 11, feature point extractor 31, and position calculator 32 function as a positioning device that measures a position of vehicle 1C. Distance calculator 35 calculates a movement distance of vehicle 1C based on a position of vehicle 1C that has been calculated by position calculator 32. Volume calculator 36 calculates a volume of load 3 based on an image captured by imaging device 17. Work calculator 37 calculates a work of vehicle 1C based on the movement distance and the volume of load 3.

Imaging devices 11, 17, feature point extractor 31, position calculator 32, distance calculator 35, volume calculator 36, and work calculator 37 function as a vehicle monitoring device that calculates the work of vehicle 1C.

In the second exemplary embodiment, imaging device 17 is also referred to as a "first imaging device", and imaging device 11 is also referred to as a "second imaging device".

Figure 19:
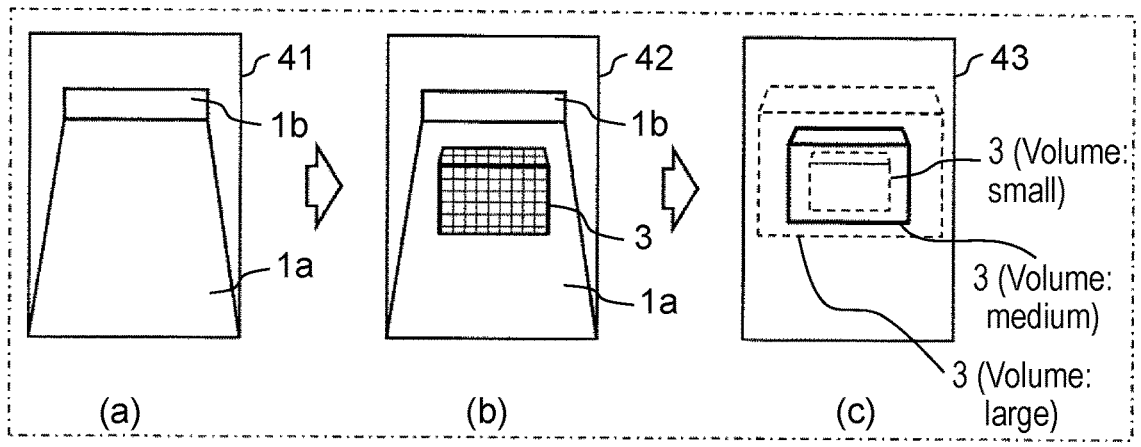
FIG. 19 is a diagram for describing calculation of a volume of load 3 that is performed by volume calculator 36 of FIG. 18, part (a) illustrates a first image captured by imaging device 17 that is an RGB camera, part (b) illustrates a second image captured by imaging device 17, and part (c) illustrates an image indicating a difference between part (a) and part (b).

FIG. 19 is a diagram for describing calculation of a volume of load 3 that is performed by volume calculator 36 of FIG. 18. FIG. 19(a) illustrates a first image captured by imaging device 17 that is an RGB camera, FIG. 19(b) illustrates a second image captured by imaging device 17, and FIG. 19(c) illustrates an image indicating a difference between FIG. 19(a) and FIG. 19(b). Imaging device 17 may be, for example, an RGB camera that obtains a color of a subject. In this case, volume calculator 36 extracts a partial image (FIG. 19(c)) indicating load 3 based on a difference between an image (FIG. 19(a)) that has been captured by imaging device 17 when load 3 is not mounted on loading platform 1a and an image (FIG. 19(b)) that has been captured by imaging device 17 when load 3 is mounted on loading platform 1a. The image illustrated in FIG. 19(a) is also referred to as a "reference image". Volume calculator 36 calculates the volume of load 3 based on a size of the partial image, e.g., based on a ratio at which the partial image occupies a screen. For example, in a case where a container having predetermined dimensions is mounted as load 3, volume calculator 36 may calculate a number of containers based on the size of the partial image, and may calculate a total volume of loads 3 based on the number of containers.

Figure 20:
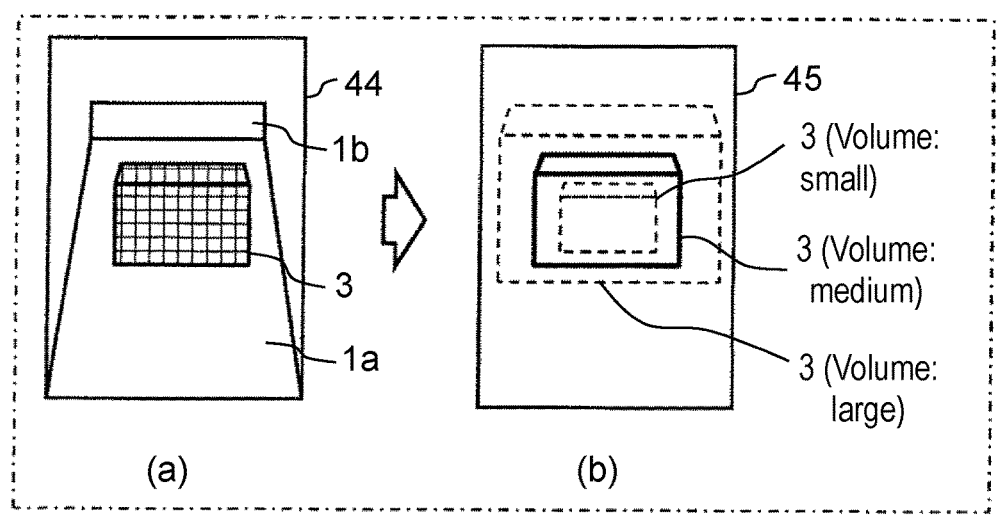
FIG. 20 is a diagram for describing calculation of a volume of load 3 that is performed by volume calculator 36 of FIG. 18, part (a) illustrates an image captured by imaging device 17 that is a depth sensor, and part (b) illustrates an image that indicates load 3 and has been generated from part (a).

FIG. 20 is a diagram for describing calculation of a volume of load 3 that is performed by volume calculator 36 of FIG. 18. FIG. 20(a) illustrates an image captured by imaging device 17 that is a depth sensor, and FIG. 20(b) illustrates an image that indicates load 3 and has been generated from FIG. 20(a). Imaging device 17 may be a depth sensor that generates an image of a subject and detects a distance from imaging device 17 to each point of the subject. Volume calculator 36 extracts a partial image indicating load 3 from an image captured by imaging device 17 based on a distance from imaging device 17 to the loading platform and a distance from imaging device 17 to load 3 that have been detected by imaging device 17. In other words, volume calculator 36 only extracts data within a range of a distance in which load 3 is present, and specifies load 3. Volume calculator 36 calculates a volume of load 3 based on a size of the partial image and the distance from imaging device 17 to load 3. Even in the case of the same type of load 3, as a distance from imaging device 17 to load 3 decreases, the partial image has a larger size. As the distance from imaging device 17 to load 3 increases, the partial image has a smaller size. Accordingly, according to a distance obtained by the depth sensor, the volume of load 3 is reduced when the distance from imaging device 17 to load 3 is short, and the volume of load 3 is increased when the distance from imaging device 17 to load 3 is long.

Work calculator 37 calculates a work of vehicle 1C based on a movement distance of vehicle 1C and the volume of load 3. The work of vehicle 1C is calculated, for example, as a product of the movement distance of vehicle 1C and the volume of load 3.

Work calculator 37 may apply a greater weight to a movement in a vertical direction with respect to the ground than a movement in a horizontal direction with respect to the ground, and may calculate the work of vehicle 1C. Gravity is applied to the movement in the vertical direction, and therefore the work increases in comparison with the movement in the horizontal direction. For example, it is assumed that x and y are movement distances on a horizontal plane, z is a movement distance in the vertical direction, and $\alpha$ is a constant that is greater than 1. In this case, weighting may be performed on a movement distance in each of xyz directions, as expressed as $\sqrt{(x^2+y^2+\alpha \times z^2)}$, and the work of vehicle 1C may be calculated. This enables a magnitude of the work of vehicle 1C to be more accurately evaluated.

Next, the monitoring of various aspects of vehicle 1C based on the work of vehicle 1C is described with reference to FIGS. 21 to 30.

Figure 21:
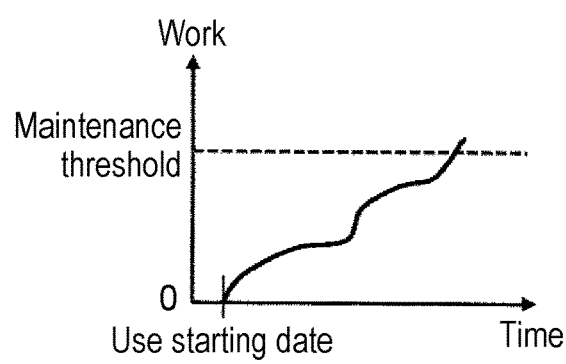
FIG. 21 is a graph indicating a total work of one vehicle 1C that is calculated by vehicle 1C or server 2 of FIG. 18.

FIG. 21 is a graph indicating a total work of one vehicle 1C that is calculated by vehicle 1C or server 2 of FIG. 18. A total work of vehicle 1C is calculated by performing time integration on a work of vehicle 1C and obtaining a sum from a use starting date. This total work is displayed on display device 25 of server 2. When this total work exceeds a predetermined threshold, a maintenance task, e.g., inspection, repair, and the like, may be performed.

Figure 22:
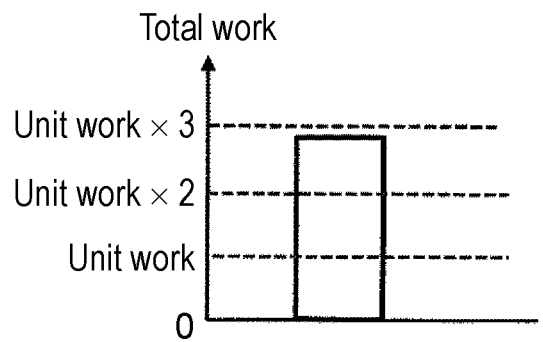
FIG. 22 is a graph indicating a sum of works of a plurality of vehicles 1C that is calculated by server 2 of FIG. 18.

FIG. 22 is a graph indicating a sum of works of a plurality of vehicles 1C that is calculated by server 2 of FIG. 18. Server 2 collects works from respective vehicles 1C. In FIG. 22, a unit work indicates a standard work of one vehicle 1C. For example, when four vehicles 1C are operating for a certain task and a sum of works of the four vehicles 1C is less than or equal to works of three vehicles, it may be determined that one vehicle 1C is a surplus and the certain task can be performed by three vehicles 1C. As illustrated in FIG. 22, by calculating a sum of works of a plurality of vehicles 1C, a number of vehicles 1C required for a task can be presented to a user (for example, an administrator of server 2).

Figure 23:
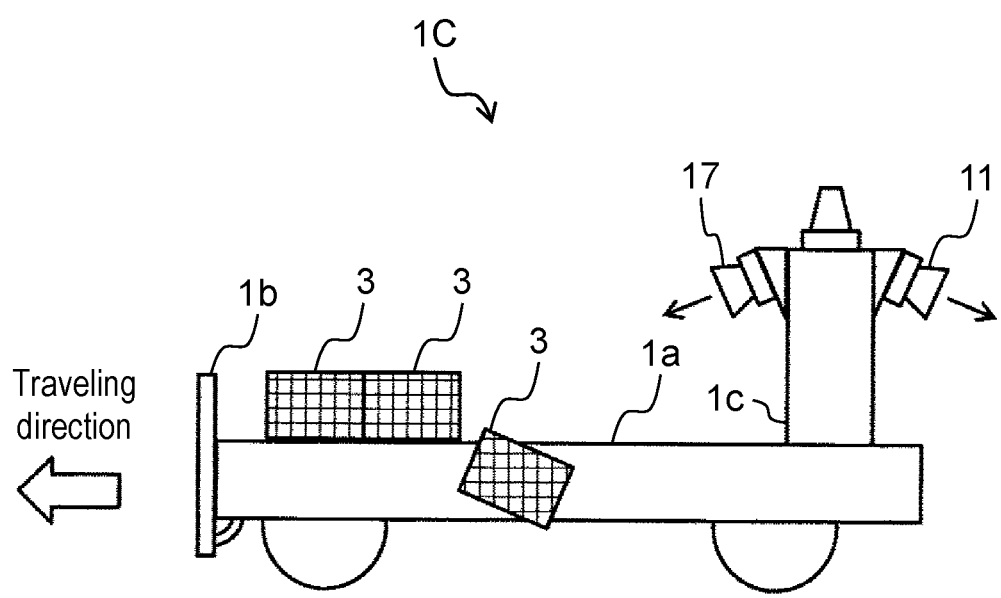
FIG. 23 is a schematic diagram illustrating a fall of load 3 from vehicle 1C of FIG. 17.

FIG. 23 is a schematic diagram illustrating a fall of load 3 from vehicle 1C of FIG. 17. In a case where at least one load 3 of loads 3 mounted on a loading platform of vehicles 1C has fallen, a distance from imaging device 17 to the load suddenly increases. This is detected as a sudden decrease in volume of load 3 by volume calculator 36.

Figure 24:
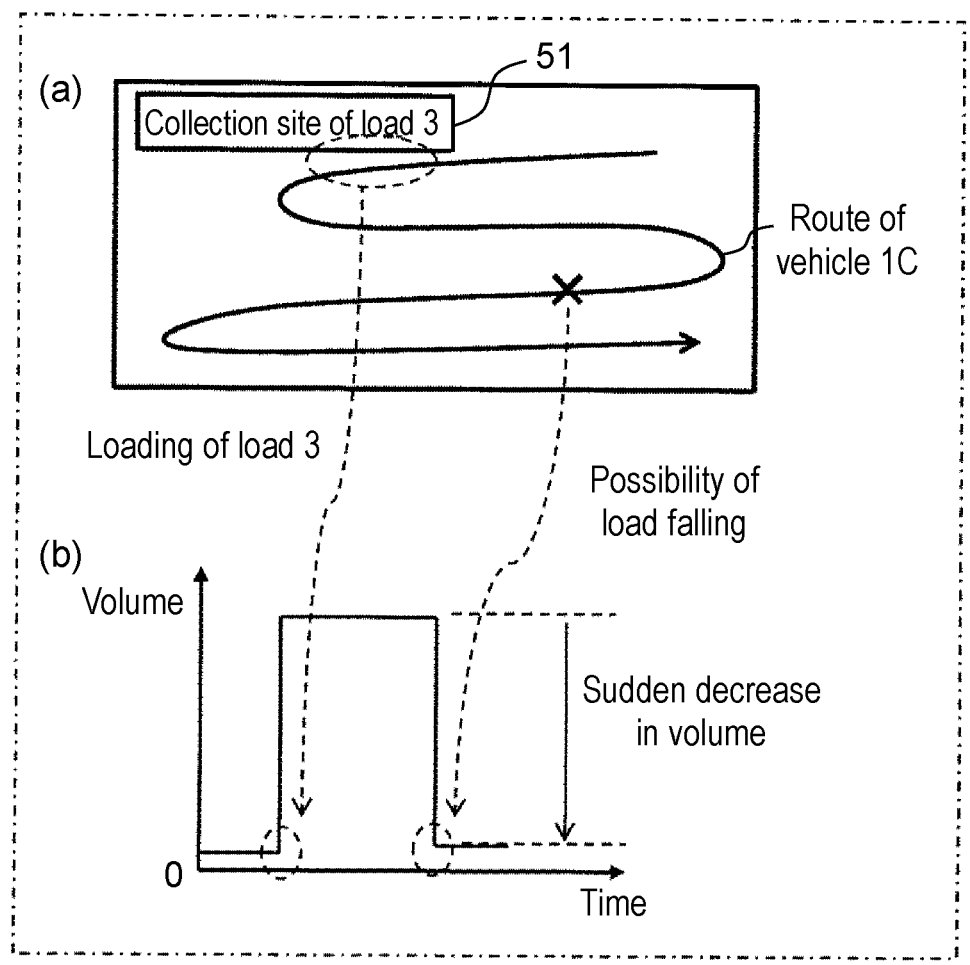
FIG. 24 is a diagram for describing detection of a fall of load 3 that is performed by vehicle 1C or server 2 of FIG. 18, part (a) is a map indicating a movement route of vehicle 1C, and part (b) is a graph indicating a change in volume of load 3.

FIG. 24 is a diagram for describing detection of a fall of load 3 that is performed by vehicle 1C or server 2 of FIG. 18. FIG. 24(a) is a map indicating a movement route of vehicle 1C, and FIG. 24(b) is a graph indicating a change in volume of load 3. In collection site 51 of load 3, load 3 is mounted on loading platform 1a of vehicle 1C. This results in an increase in volume of load 3, as illustrated in FIG. 24(b). When vehicle 1C is moving in a state where vehicle 1C is mounted with load 3 (stated another way, before vehicle 1C arrives at another collection site serving as a destination) and when a volume of load 3 has suddenly decreased, work calculator 37 may emit an alarm reporting a fall of load 3, for example, via display device 14. If the volume of load 3 has changed in a place other than the collection site of load 3, there is a possibility of a fall of load 3. When vehicle 1C is moving in a state where vehicle 1C is mounted with load 3 and when the volume of load 3 has suddenly decreased, server 2 may record a position where the volume of load 3 has suddenly decreased. By visualizing a place where load 3 has fallen during conveyance, load 3 can be conveyed more reliably.

Figure 25:
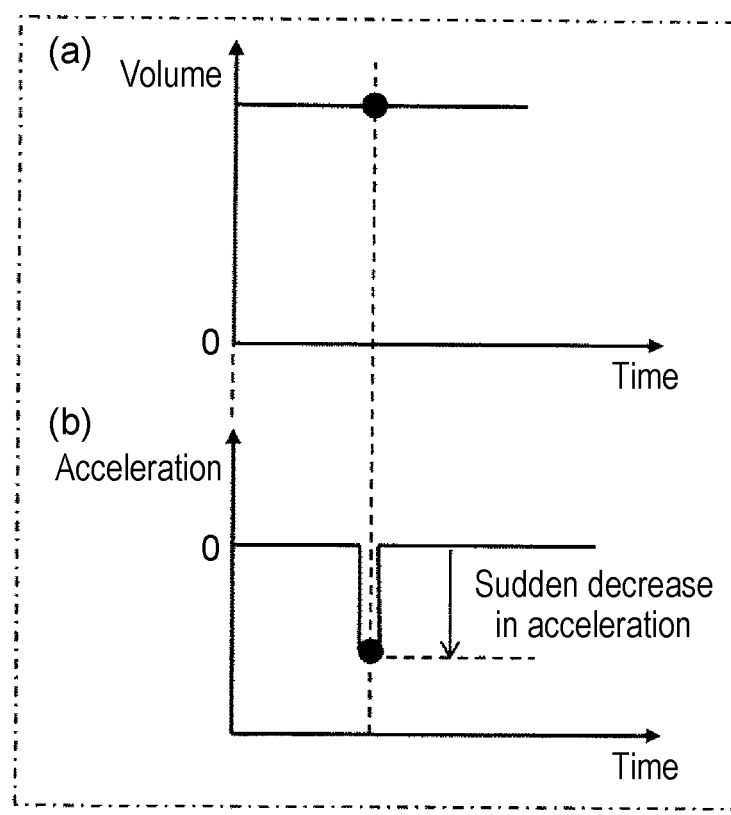
FIG. 25 is a diagram for describing detection of a possibility of a fall of load 3 that is performed by vehicle 1C of FIG. 18, part (a) is a graph indicating a change in volume of load 3, and part (b) is a graph indicating a change in acceleration of vehicle 1C.

FIG. 25 is a diagram for describing detection of a possibility of a fall of load 3 that is performed by vehicle 1C or server 2 of FIG. 18. FIG. 25(a) is a graph indicating a change in volume of load 3, and FIG. 25(b) is a graph indicating a change in acceleration of vehicle 1C. As illustrated in FIG. 25(a), if the volume of load 3 has a non-zero value, it is understood that load 3 is mounted on the loading platform of vehicle 1C. In addition, work calculator 37 may further calculate an acceleration of vehicle 1C. When vehicle 1C is moving in a state where vehicle 1C is mounted with load 3 and when the acceleration of vehicle 1C has suddenly decreased (for example, at the time of sudden braking), work calculator 37 may emit an alarm reporting a possibility of a fall of load 3, for example, via display device 14. When the acceleration of vehicle 1C suddenly decreases, there is a possibility of a fall of load 3. When vehicle 1C is moving in a state where vehicle 1C is mounted with load 3 and when the acceleration of vehicle 1C has suddenly decreased, server 2 may record a position where there has been a possibility of a fall of load 3. By visualizing a possibility of a fall of load 3, load 3 can be conveyed more reliably. In addition, a fall of load 3 can be detected in real time based on the acceleration of vehicle 1C.

Figure 26:
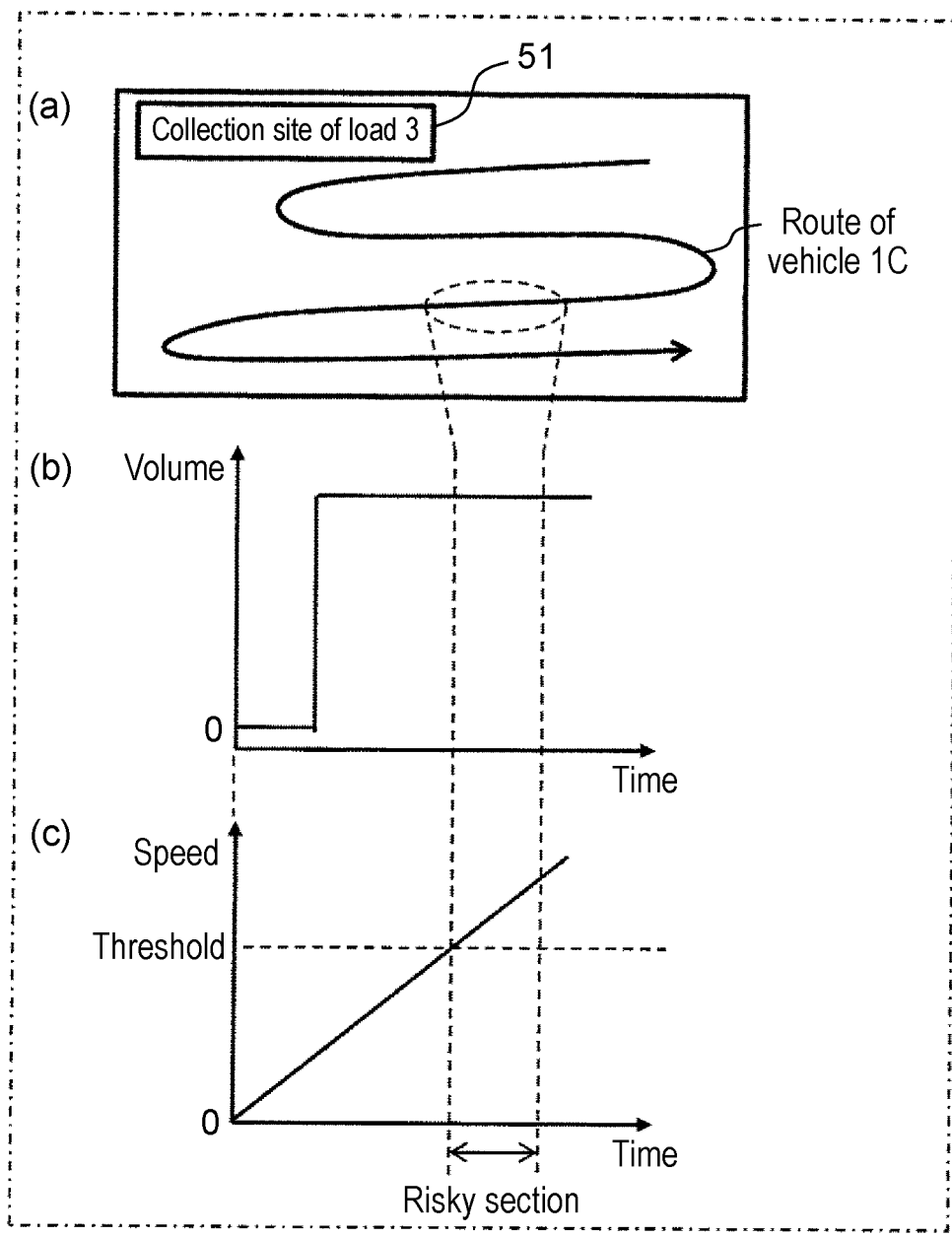
FIG. 26 is a diagram for describing detection of a risky section that is performed by vehicle 1C or server 2 of FIG. 18, part (a) is a map indicating a movement route of vehicle 1C, part (b) is a graph indicating a change in volume of load 3, and part (c) is a graph indicating a change in speed of vehicle 1C.

FIG. 26 is a diagram for describing detection of a risky section that is performed by vehicle 1C or server 2 of FIG. 18. FIG. 26(a) is a map indicating a movement route of vehicle 1C, FIG. 26(b) is a graph indicating a change in volume of load 3, and FIG. 26(c) is a graph indicating a change in speed of vehicle 1C. In a case where vehicle 1C is moving at high speed in a state where vehicle 1C is mounted with load 3 having a larger volume on the loading platform, it can be considered that there will be a high risk when an accident such as collision occurs, in comparison with a case where vehicle 1C is moving at low speed in a state where vehicle 1C is mounted with load 3 having a smaller volume on the loading platform (or without any loads). When a product of the speed of vehicle 1C and the volume of load 3 has exceeded a predetermined threshold (also referred to as a "first threshold"), work calculator 37 may emit an alarm reporting a risk at the time of the occurrence of an accident, for example, via display device 14. Server 2 may record a position where the product of the speed of vehicle 1C and the volume of load 3 has exceeded the predetermined threshold (the "first threshold"). In a place that has been determined to be a risky section, countermeasures, such as an increase in width of a passage, may be taken to reduce a risk. By visualizing a risky section, load 3 can be conveyed more safely.

When a product of the acceleration of vehicle 1C instead of the speed of vehicle 1C and the volume of load 3 has exceeded a predetermined threshold, work calculator 37 may emit an alarm reporting a risk at the time of occurrence of an accident, for example, via display device 14. Server 2 may record a position where the product of the acceleration of vehicle 1C instead of the speed of vehicle 1C and the volume of load 3 has exceeded the predetermined threshold.

Figure 27:
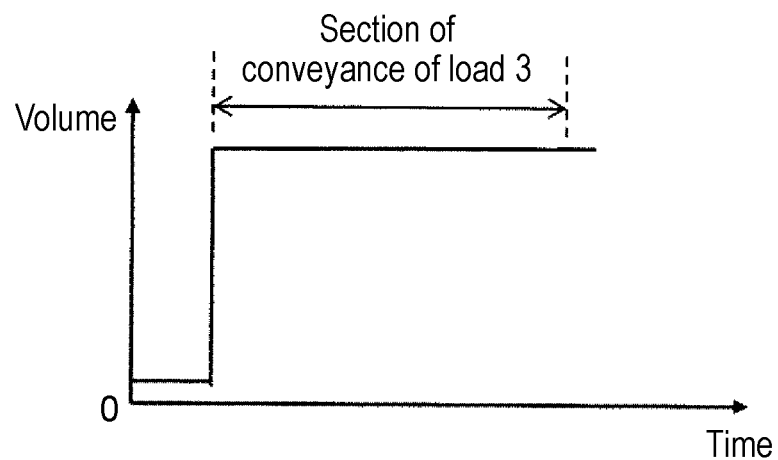
FIG. 27 is a graph for describing routing of vehicle 1C that is performed by server 2 of FIG. 18.

FIG. 27 is a graph for describing routing of vehicle 1C that is performed by server 2 of FIG. 18. Server 2 records a movement route of a movement without a change in volume of load 3. In a case where the volume of load 3 mounted on the loading platform of vehicle 1C has not changed over a long distance, it can be considered that load 3 has not been loaded onto or unloaded from the loading platform over a long distance and a task includes a waste. When a movement distance of a movement route through which vehicle 1C has moved without loading or unloading load 3 onto or from the loading platform has exceeded a predetermined threshold (also referred to as a "second threshold"), server 2 searches for a movement route that has a movement distance that is shorter than a current movement distance (the movement distance that has exceeded the second threshold).

Server 2 uses, for example, the Dijkstra's algorithm, sets a node at a departure position, an arrival position, and each corner on the movement route, and sets a distance as a cost required to pass through an edge, and therefore server 2 calculates a shortest route.

Figure 28:
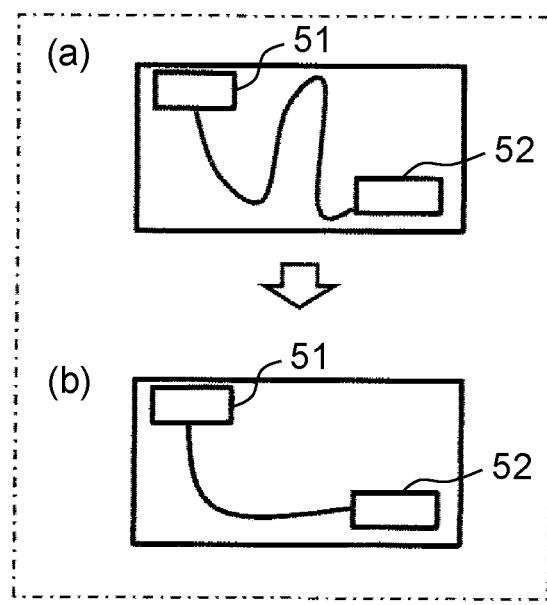
FIG. 28 is a diagram for describing a first example of routing of vehicle 1C that is performed by server 2 of FIG. 18, part (a) is a diagram illustrating a movement route of vehicle 1C before a change, and part (b) is a diagram illustrating a movement route of vehicle 1C after a change.

FIG. 28 is a diagram for describing a first example of routing of vehicle 1C that is performed by server 2 of FIG. 18. FIG. 28(a) is a map indicating a movement route of vehicle 1C before a change, and FIG. 28(b) is a map indicating a movement route of vehicle 1C after a change. A case is examined where load 3 is conveyed between collection sites 51, 52. FIG. 28(a) illustrates a case where vehicle 1C has been mounted with load 3 for a long time and vehicle 1C is making a detour. In this case, server 2 may search for an optimum route, as illustrated in FIG. 28(b), and may move vehicle 1C along this route.

Figure 29:
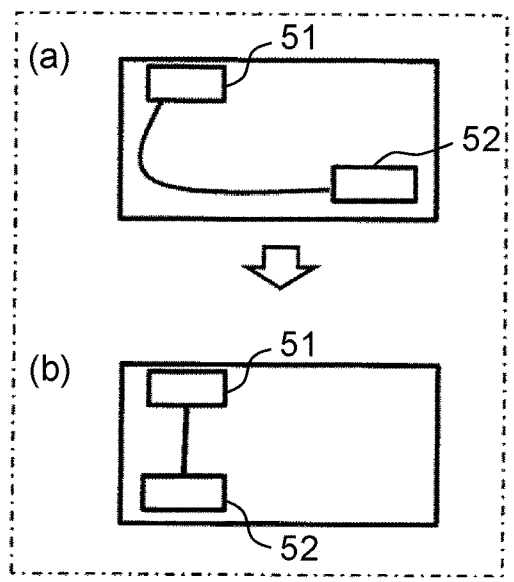
FIG. 29 is a diagram for describing a second example of routing of vehicle 1C that is performed by server 2 of FIG. 18, part (a) is a diagram illustrating a movement route of vehicle 1C before a change, and part (b) is a diagram illustrating a movement route of vehicle 1C after a change.

FIG. 29 is a diagram for describing a second example of routing of vehicle 1C that is performed by server 2 of FIG. 18. FIG. 29(a) is a map indicating a movement route of vehicle 1C before a change, and FIG. 29(b) is a map indicating a movement route of vehicle 1C after a change. FIG. 29(a) illustrates a case where a distance is long between collection sites 51, 52 between which load 3 is frequently conveyed. In this case, server 2 may conduct a display indicating that positions of collection sites 51, 52 will be changed, on display device 25 of server 2.

As described above, by recording a movement route through which vehicle 1C has moved without any change in volume of load 3, a movement route of vehicle 1C can be optimized, or disposition of collection sites 51, 52 or load 3 can be optimized.

Figure 30:
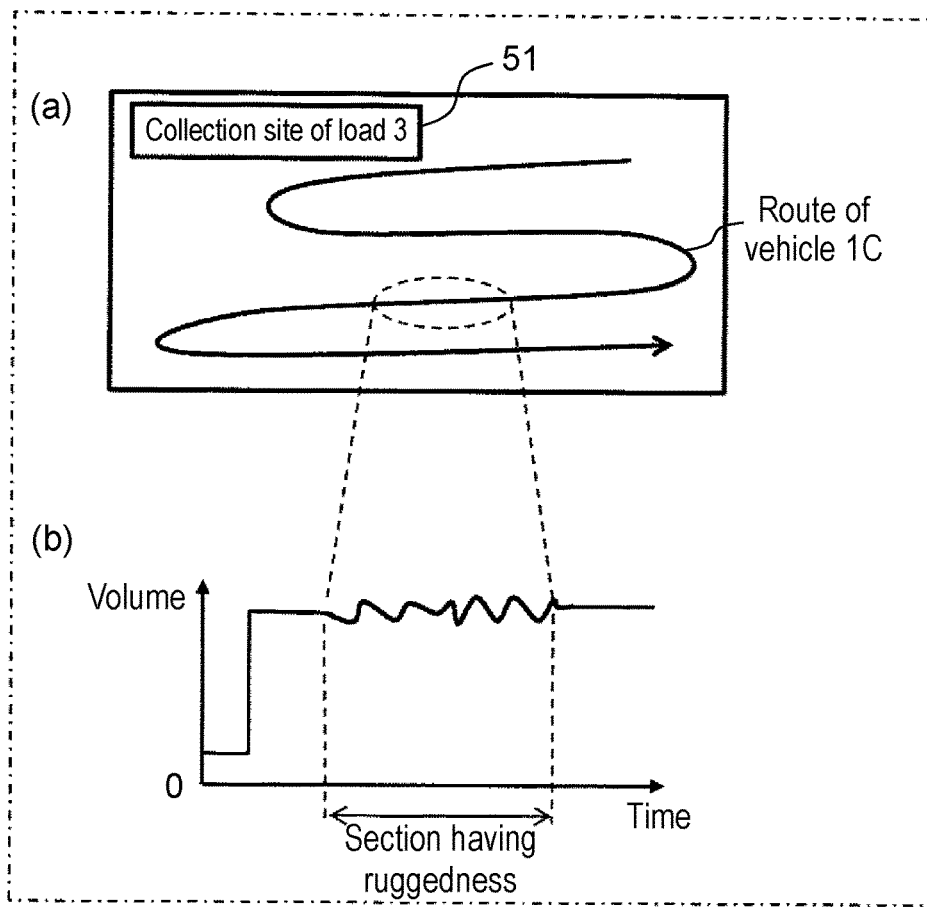
FIG. 30 is a diagram for describing detection of a section having ruggedness that is performed by server 2 of FIG. 18, part (a) is a diagram illustrating a movement route of vehicle 1C, and part (b) is a graph indicating a change in volume of load 3.

FIG. 30 is a diagram for describing detection of a section having ruggedness that is performed by server 2 of FIG. 18. FIG. 30(a) is a map indicating a movement route of vehicle 1C, and FIG. 30(b) is a graph indicating a change in volume of load 3. Server 2 records a range where a volume of load 3 has kept fluctuating over a movement distance that has exceeded a predetermined threshold (also referred to as a "third threshold") during a movement of vehicle 1C. In a case where the volume of load 3 keeps fluctuating slightly, it can be considered that load 3 mounted on the loading platform of vehicle 1C is vibrating due to ruggedness of the ground. Server 2 may calculate, for example, variance per unit time of the volume of load 3. When the variance has exceeded a predetermined threshold, server 2 may determine that a section has ruggedness. By visualizing a section having ruggedness, it can be determined whether road surface maintenance needs to be performed.

As described above, by using a product of a movement distance of vehicle 1C and a volume of load 3 as a work of vehicle 1C, various aspects of vehicle 1C, such as whether maintenance needs to be performed on a vehicle, can be evaluated more accurately in comparison with a case where only the movement distance is used.

Vehicle 1C may include an alarm device using sound, such as a speaker or a buzzer, instead of display device 14 in order to emit an alarm reporting a fall of load 3, or the like.

Next, a first variation of the second exemplary embodiment is described with reference to FIGS. 31 and 32.

In the second exemplary embodiment, the positioning device according to the first exemplary embodiment is not always included. An arbitrary positioning device in a conventional technique may be included.

Figure 31:
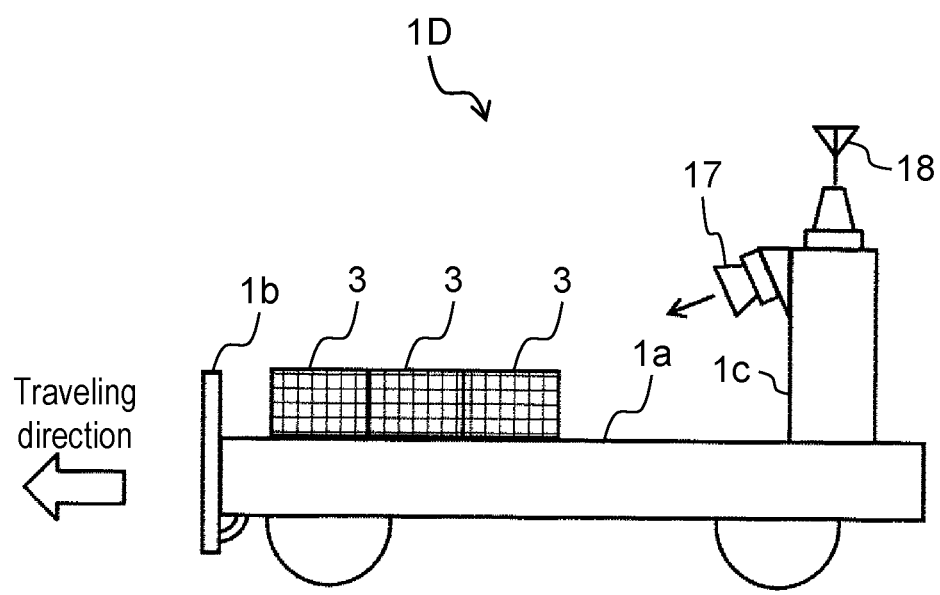
FIG. 31 is a schematic diagram illustrating a configuration of vehicle 1D in a first variation of the second exemplary embodiment.

FIG. 31 is a schematic diagram illustrating a configuration of vehicle 1D in the first variation of the second exemplary embodiment. Vehicle 1D includes positioning device 18 instead of imaging device 11 of FIG. 1.

Figure 32:
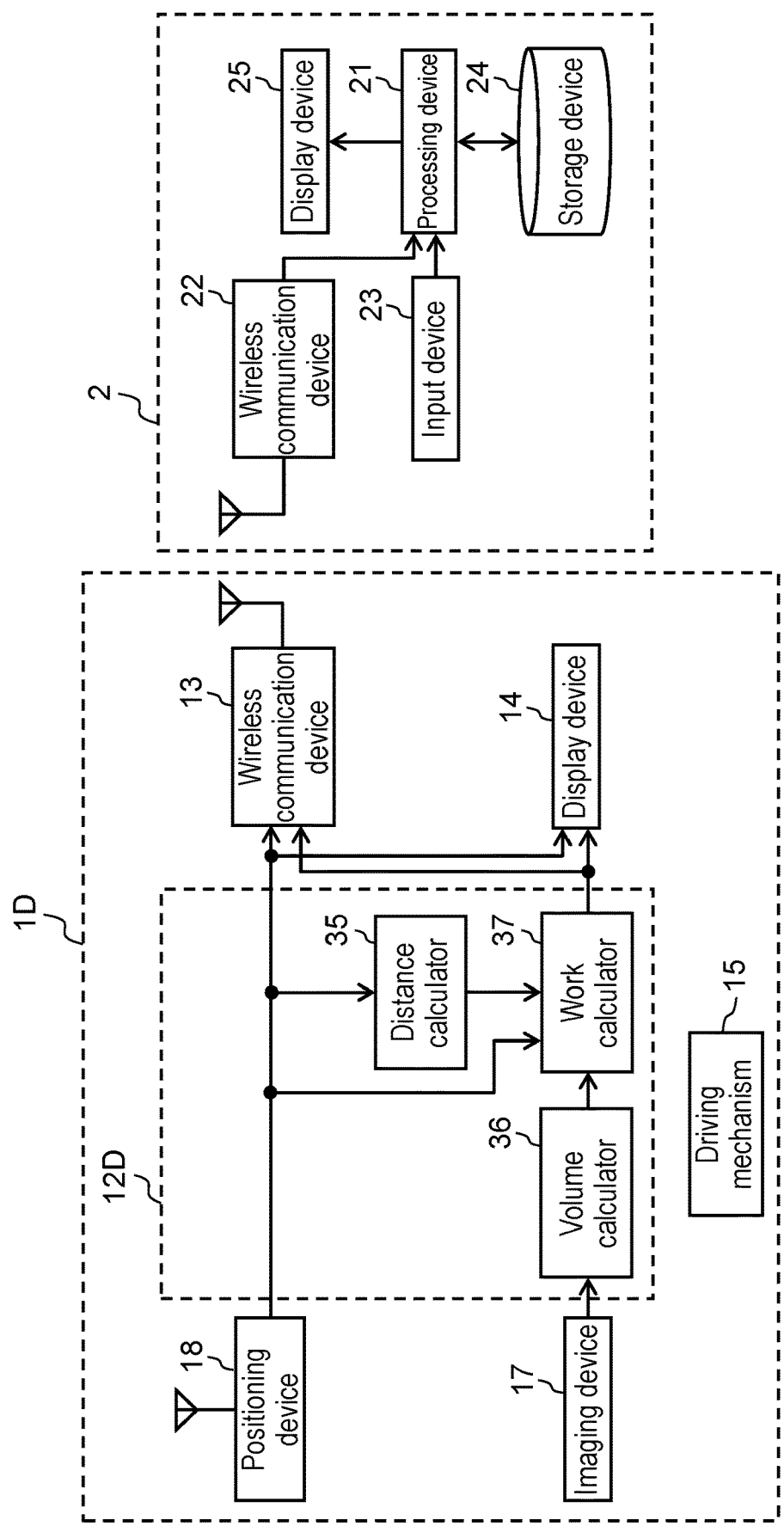
FIG. 32 is a block diagram illustrating a configuration of a vehicle monitoring system including vehicle 1D of FIG. 31.

FIG. 32 is a block diagram illustrating a configuration of a vehicle monitoring system including vehicle 1D of FIG. 31. A positioning system of FIG. 32 includes at least one vehicle 1D and server 2. Each of vehicles 1D includes positioning device 18 and processing device 12D instead of imaging device 11 and processing device 12C in vehicle 1C of FIG. 18. Positioning device 18 measures a position of vehicle 1D by using, as a signal source, a wireless transmitter, such as an RFID tag, that is provided in a known fixed position outside vehicle 1D. Processing device 12D has a configuration in which feature point extractor 31 and position calculator 32 have been removed from processing device 12C of FIG. 18.

In the vehicle monitoring system illustrated in FIG. 32, similarly to the vehicle monitoring system illustrated in FIG. 18, a product of a movement distance of vehicle 1D and a volume of load 3 is used as a work of vehicle 1D. By doing this, various aspects of vehicle 1D, such as whether maintenance needs to be performed on a vehicle, can be evaluated more accurately than in a conventional technique.

Next, a second variation of the second exemplary embodiment is described with reference to FIGS. 33 and 34.

In the second exemplary embodiment, a product of a movement distance of a vehicle and a volume of a load is not always used as a work of the vehicle. A product of the movement distance of the vehicle and a weight of the load may be used as the work of the vehicle.

Figure 33:
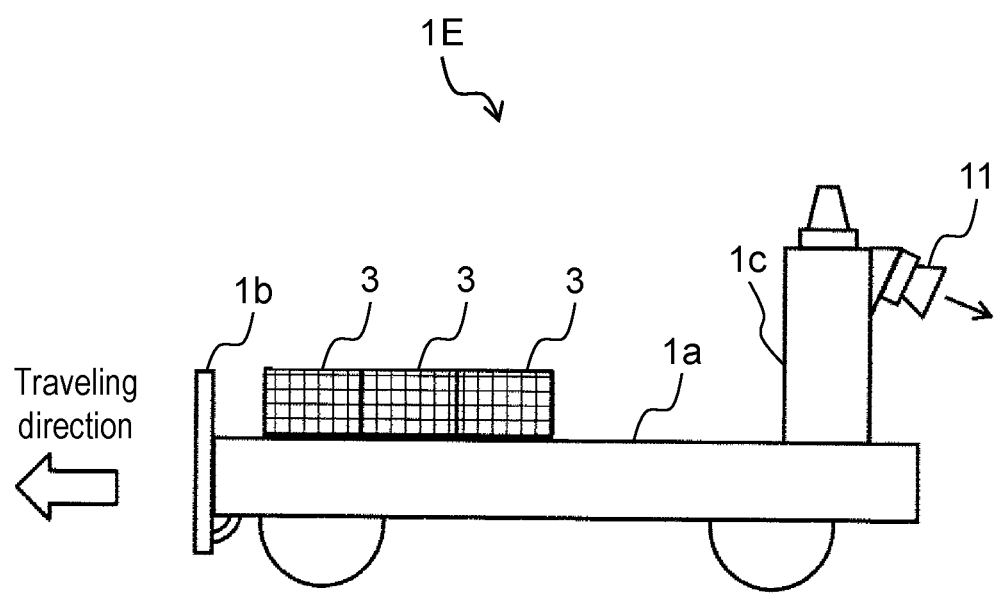
FIG. 33 is a schematic diagram illustrating a configuration of vehicle 1E in a second variation of the second exemplary embodiment.

FIG. 33 is a schematic diagram illustrating a configuration of vehicle 1E in the second variation of the second exemplary embodiment. Vehicle 1E includes a weighing device that measures a weight of load 3 mounted on loading platform 1a instead of imaging device 17 of FIG. 17, as described later.

Figure 34:
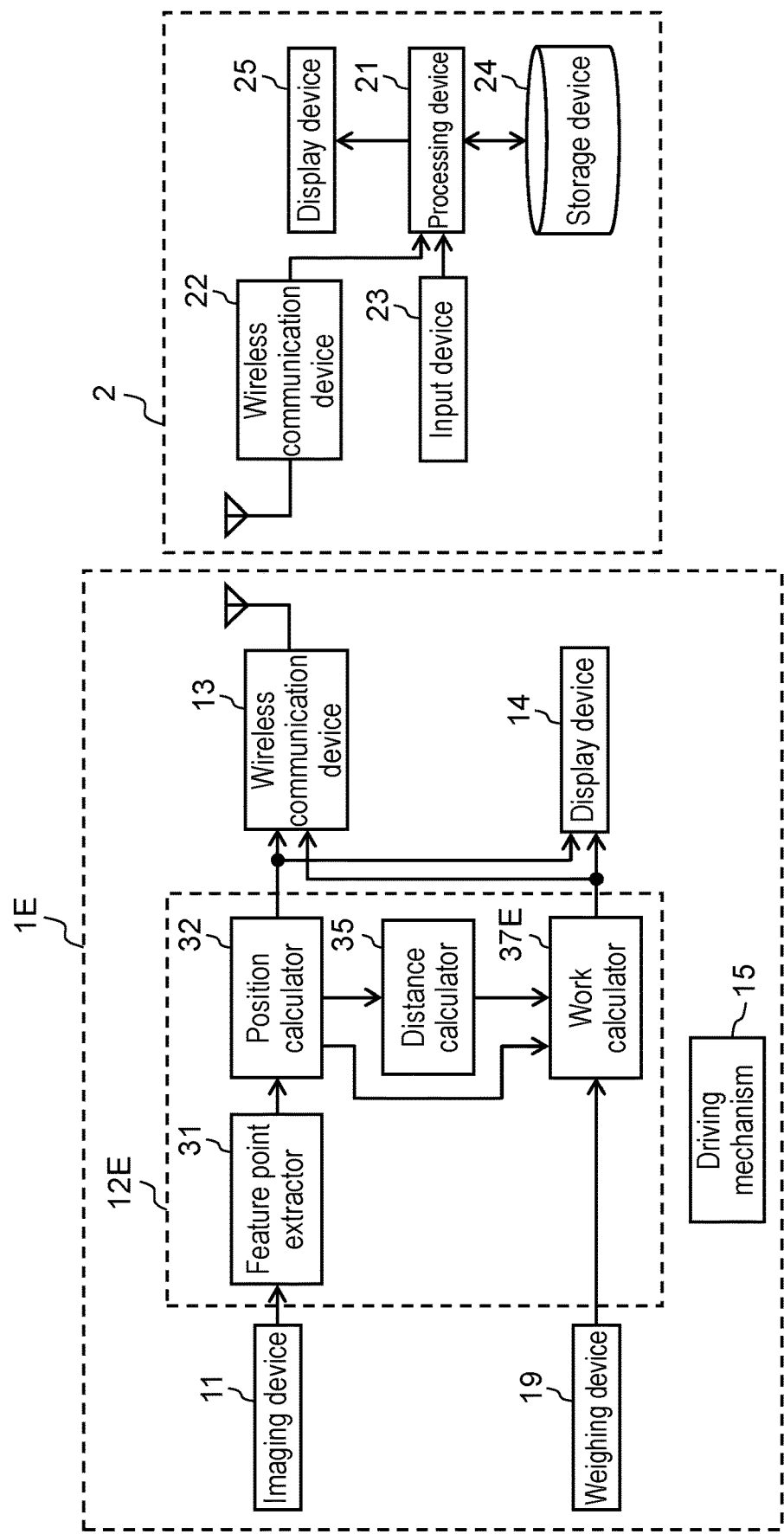
FIG. 34 is a block diagram illustrating a configuration of a vehicle monitoring system including vehicle 1D of FIG. 33.

FIG. 34 is a block diagram illustrating a configuration of a vehicle monitoring system including vehicle 1D of FIG. 33. A positioning system of FIG. 34 includes at least one vehicle 1E and server 2. Each of vehicles 1E includes weighing device 19 and work calculator 37E instead of imaging device 17, volume calculator 36, and work calculator 37 in vehicle 1C of FIG. 18. Weighing device 19 measures a weight of load 3 mounted on loading platform 1a. Work calculator 37E calculates a work of vehicle 1E based on a movement distance of vehicle 1E and a weight of a load.

Weighing device 19 may be incorporated, for example, into elevating mechanism 1b. When load 3 is loaded onto loading platform 1a, elevating mechanism 1b elevates load 3 from the ground up to a height of loading platform 1a. At this time, weighing device 19 incorporated into elevating mechanism 1b measures a weight of load 3.

In a case where vehicle 1E is a forklift, the weighing device may be incorporated, for example, into a fork and a mast (a mechanism for elevating a load) of the forklift.

Instead of incorporating the weighing device into a vehicle, as illustrated in FIG. 34, the weight of load 3 may be calculated from the volume of load 3 without incorporating the weighing device into a vehicle. In vehicle 1C of FIG. 17 or vehicle 1D of FIG. 32, work calculator 37 may multiply the volume of load 3 by a density of load 3 to calculate a weight of load 3, and may calculate a work of a vehicle based on a movement distance of the vehicle and the weight of load 3.

In the second variation of the second exemplary embodiment, a product of a movement distance of a vehicle and a weight of load 3 is used as a work of the vehicle. By doing this, various aspects of vehicle 1C, such as whether maintenance needs to be performed on a vehicle, can be evaluated more accurately than in a conventional technique, similarly to a case where a product of a movement distance of a vehicle and a volume of load 3 as a work of the vehicle.

According to the second exemplary embodiment, a product of a movement distance of a vehicle and a volume of a load or a product of the movement distance of the vehicle and a weight of the load is used as a work of the vehicle. By doing this, various aspects of a vehicle, such as whether maintenance needs to be performed on the vehicle, can be evaluated more accurately than in a case where only the movement distance is used.

According to the second exemplary embodiment, a work (an amount of activity) of a vehicle can be appropriately visualized.

According to the second exemplary embodiment, disposition of a passage, a shelf, or a vehicle in a factory or a warehouse can be optimized.

According to the second exemplary embodiment, a risky section can be specified, and safety can be improved.

INDUSTRIAL APPLICABILITY

A positioning device and a vehicle according to the first exemplary embodiment of the present disclosure can be utilized to measure a position of a vehicle with high precision by using an imaging device. In addition, the positioning device and the vehicle according to the first exemplary embodiment can be utilized to measure a position of a vehicle with high precision without shielding a field of view of an imaging device due to a load in a vehicle that includes a loading platform on a front side facing a traveling direction of the vehicle.

A vehicle monitoring device, a vehicle, and a vehicle monitoring system according to the second exemplary embodiment of the present disclosure can be utilized to monitor an operation of a vehicle and accurately measure a work of the vehicle.

REFERENCE MARKS IN THE DRAWINGS 1, 1A to 1E: vehicle
1a: loading platform
1b: elevating mechanism
1c: mast
2: server
3: load
4, 4-1, 4-2: RFID tag
5: marker
6: illuminating device
7: pattern of luminance that temporally changes
11: imaging device
12, 12A to 12E: processing device
13: wireless communication device
14: display device
15: driving mechanism
16: RFID reader
17: imaging device
18: positioning device
19: weighing device
21: processing device
22: wireless communication device
23: input device
24: storage device
25: display device
31: feature point extractor
32: position calculator
33: position corrector
34: marker recognizer
35: distance calculator
36: volume calculator
37, 37E: work calculator
40 to 45: image
51, 52: collection site of load 3

The invention claimed is:

1. A vehicle monitoring system comprising:
a first camera that captures an image of a load mounted on a loading platform; and
a circuit that calculates a volume of the load based on the image capture by the first camera,
wherein the circuit performs:
extracting a partial image indicating the load based on a difference between a reference image and the image of the load mounted on the loading platform, the reference image being captured by the first camera when the load is not mounted on the loading platform; and
calculating the volume of the load based on a ratio at which the partial image occupies an entirety of the image.

2. The vehicle monitoring system according to claim 1, wherein:
the first camera detects a distance from the first camera to the load, and
the circuit calculates the volume of the load based on the detected distance.

3. The vehicle monitoring system according to claim 1, wherein the vehicle monitoring system emits an alarm when the volume of the load has suddenly decreased during a movement of the vehicle.

4. The vehicle monitoring system according to claim 1, wherein the vehicle monitoring system emits an alarm when an acceleration of the vehicle has suddenly decreased.

5. The vehicle monitoring system according to claim 1, wherein the vehicle monitoring system emits an alarm when a product of a speed of the vehicle and the volume of the load has exceeded a first threshold.

6. A vehicle comprising:
the vehicle monitoring system according to claim 1; and
the loading platform.

7. The vehicle according to claim 6, further comprising an elevating mechanism that loads the load onto the loading platform and unloads the load from the loading platform.

8. The vehicle monitoring system according to claim 1, further comprising:
a server.

9. The vehicle monitoring system according to claim 8, wherein the server records a position where a volume of the load has suddenly decreased during a movement of the vehicle.

10. The vehicle monitoring system according to claim 8, wherein the server records a position where an acceleration of the vehicle has suddenly decreased.

11. The vehicle monitoring system according to claim 8, wherein the server records a position where a product of a speed of the vehicle and a volume of the load has exceeded a first threshold.

12. The vehicle monitoring system according to claim 8, wherein the server performs:
   recording a movement route of a movement without a change in a volume of the load; and
   when a movement distance of the movement route has exceeded a second threshold, searching for a movement route having a movement distance that is shorter than the movement distance that has exceeded the second threshold.

13. The vehicle monitoring system according to claim 8, wherein the server records a range where a volume of the load has kept fluctuating over a movement distance that has exceeded a third threshold during a movement of the vehicle.

14. The vehicle monitoring system according to claim 1, wherein the circuit calculates a work of the vehicle based on a movement and the volume of the load.

15. The vehicle monitoring system according to claim 14, wherein the circuit applies a greater weight to a movement in a vertical direction with respect to a ground than a movement in a horizontal direction with respect to the ground, to calculate the work of the vehicle.

16. The vehicle monitoring system according to claim 14, wherein the circuit multiplies the volume of the load by a density of the load to calculate a weight of the load, and calculates the work of the vehicle based on the movement and the weight of the load.

17. The vehicle monitoring system according to claim 1, wherein the circuit calculates a position of the vehicle.

18. The vehicle monitoring system according to claim 17, further comprising:
   a second camera that is provided in the vehicle to capture an image of a rear direction of the vehicle, the rear direction being reverse to a traveling direction of the vehicle,
   wherein the circuit:
      extracts a feature point of the image captured by the second imaging device; and
      calculates the position of the vehicle based on the feature point of the image.

* * * * *